(12) United States Patent
Ishii et al.

(10) Patent No.: US 9,501,206 B2
(45) Date of Patent: Nov. 22, 2016

(54) INFORMATION PROCESSING APPARATUS

(71) Applicant: Panasonic Corporation, Kadoma-shi, Osaka (JP)

(72) Inventors: Takumi Ishii, Osaka (JP); Yusaku Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 14/313,483

(22) Filed: Jun. 24, 2014

(65) Prior Publication Data

US 2015/0007106 A1  Jan. 1, 2015

(30) Foreign Application Priority Data

Jun. 27, 2013 (JP) .................................. 2013-134602
Jun. 20, 2014 (JP) .................................. 2014-127362

(51) Int. Cl.
| G06F 15/00 | (2006.01) |
| G06F 13/00 | (2006.01) |
| G06F 3/0482 | (2013.01) |
| G06F 3/0484 | (2013.01) |

(52) U.S. Cl.
CPC ......... *G06F 3/0482* (2013.01); *G06F 3/04842* (2013.01)

(58) Field of Classification Search
CPC .......................... G02B 21/365; H04N 5/23238
USPC ........ 715/761–765, 860–862, 851–853, 771, 715/863
See application file for complete search history.

(56) References Cited

U.S. PATENT DOCUMENTS 6,184,859 B1  2/2001  Kojima
8,907,899 B2  12/2014  Park et al.
(Continued)

FOREIGN PATENT DOCUMENTS

JP  4-359311  12/1992
JP  9-6984    1/1997
(Continued)

OTHER PUBLICATIONS

Office Action issued in corresponding Japanese Patent Application No. 2014-127358 on May 10, 2016.
(Continued)

*Primary Examiner* — Kevin Nguyen
(74) *Attorney, Agent, or Firm* — Hamre, Schumann, Mueller & Larson, P.C.

(57) ABSTRACT

A processor in an information processing apparatus causes a display device to display a predetermined popup menu according to a predetermined operation to an input device for calling a popup menu. The processor causes the display device to superimpose and display, an enlarged image obtained by enlarging an enlargement target region which is a part of a region in an image, according to a predetermined operation for displaying the enlarged image of the enlargement target region. When the input device receives an operation for calling a popup menu relevant to the enlarged image while the enlarged image of the enlargement target region is displayed in the display device, the processor causes the display device to stop displaying of the enlarged image of the enlargement target region, and to display a first enlarged popup menu which is obtained by enlarging the popup menu relevant to the enlarged image.

7 Claims, 17 Drawing Sheets

(56) References Cited

U.S. PATENT DOCUMENTS

| | | |
|---|---|---|
| 2007/0247435 A1 | 10/2007 | Benko et al. |
| 2009/0295830 A1 | 12/2009 | Muraveynyk et al. |
| 2012/0131488 A1 | 5/2012 | Karlsson et al. |
| 2013/0201533 A1 | 8/2013 | Takemoto |
| 2013/0293672 A1* | 11/2013 | Suzuki ............... H04N 5/23238 348/36 |
| 2014/0062917 A1 | 3/2014 | Seo et al. |
| 2014/0298153 A1* | 10/2014 | Tsujimoto ............ G02B 21/365 715/232 |
| 2015/0033193 A1 | 1/2015 | Beaurepaire |

FOREIGN PATENT DOCUMENTS

| | | |
|---|---|---|
| JP | 11-244245 A | 9/1999 |
| JP | 2005-251104 A | 9/2005 |
| JP | 2012-48465 A | 3/2012 |
| JP | 2012-123066 | 6/2012 |
| JP | 2012-175486 A | 9/2012 |
| WO | WO 2012/108132 | 8/2012 |

OTHER PUBLICATIONS

Form PTO-892 issued in U.S. Appl. No. 14/313,454 on Apr. 20, 2016.

* cited by examiner

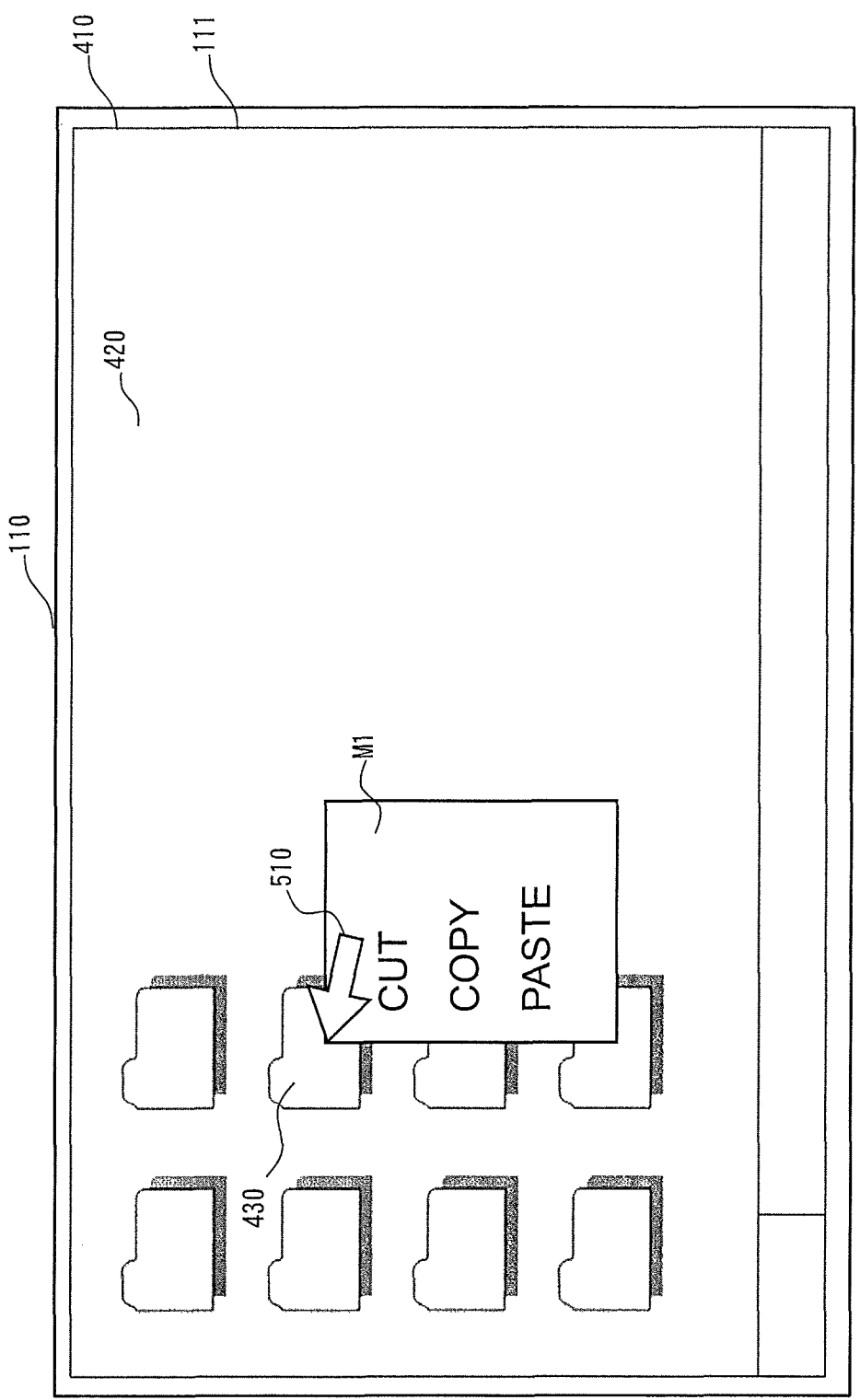

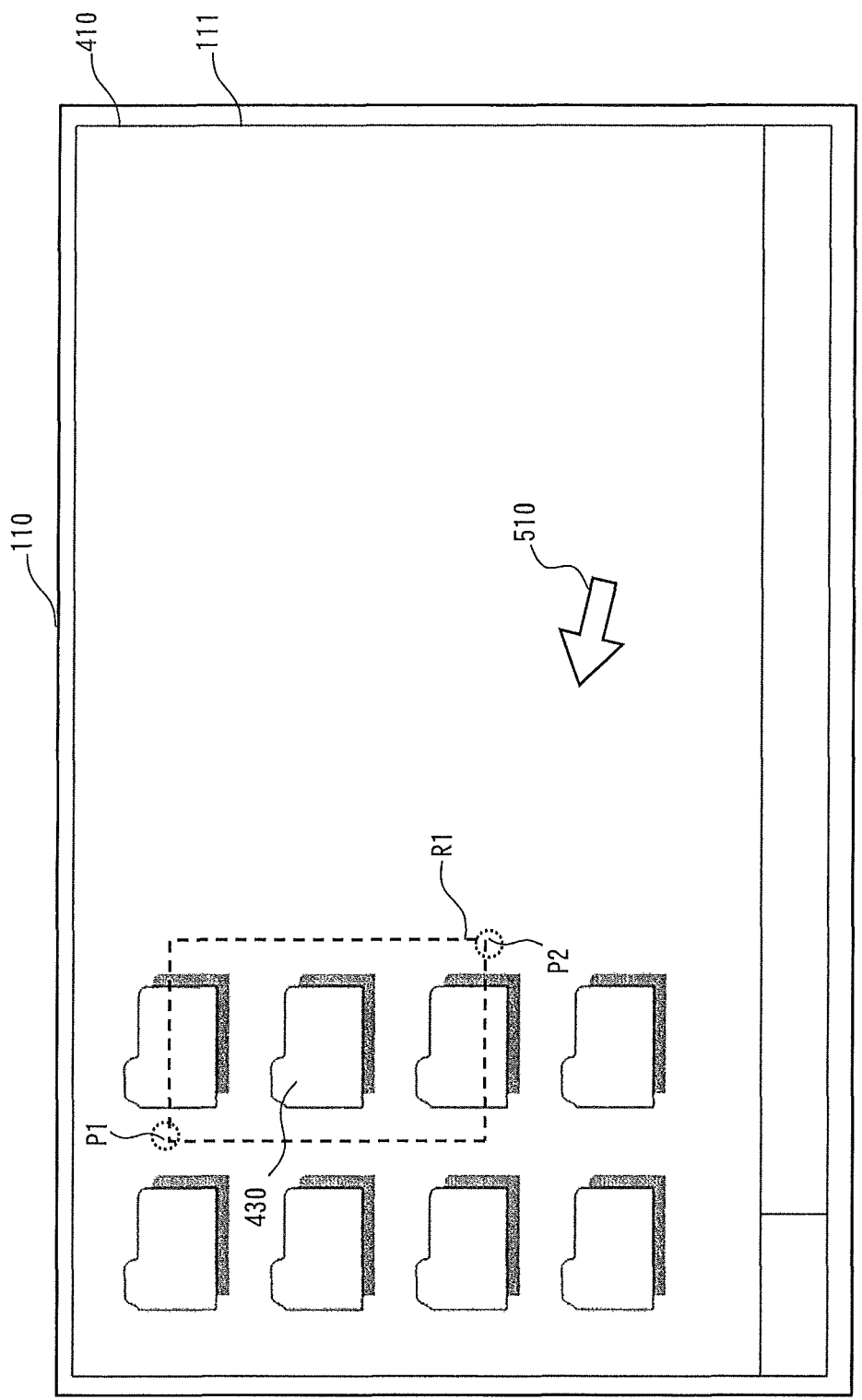

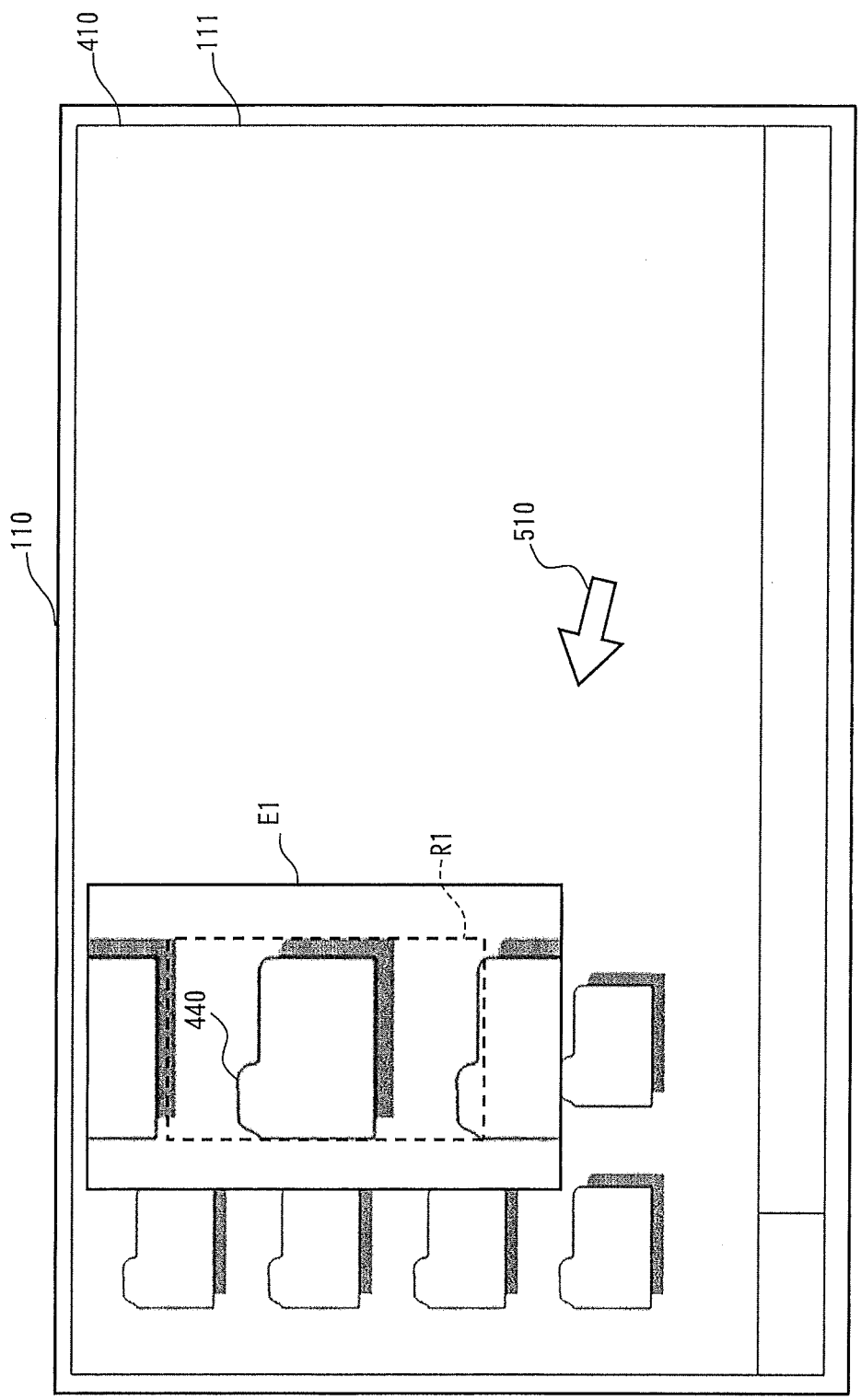

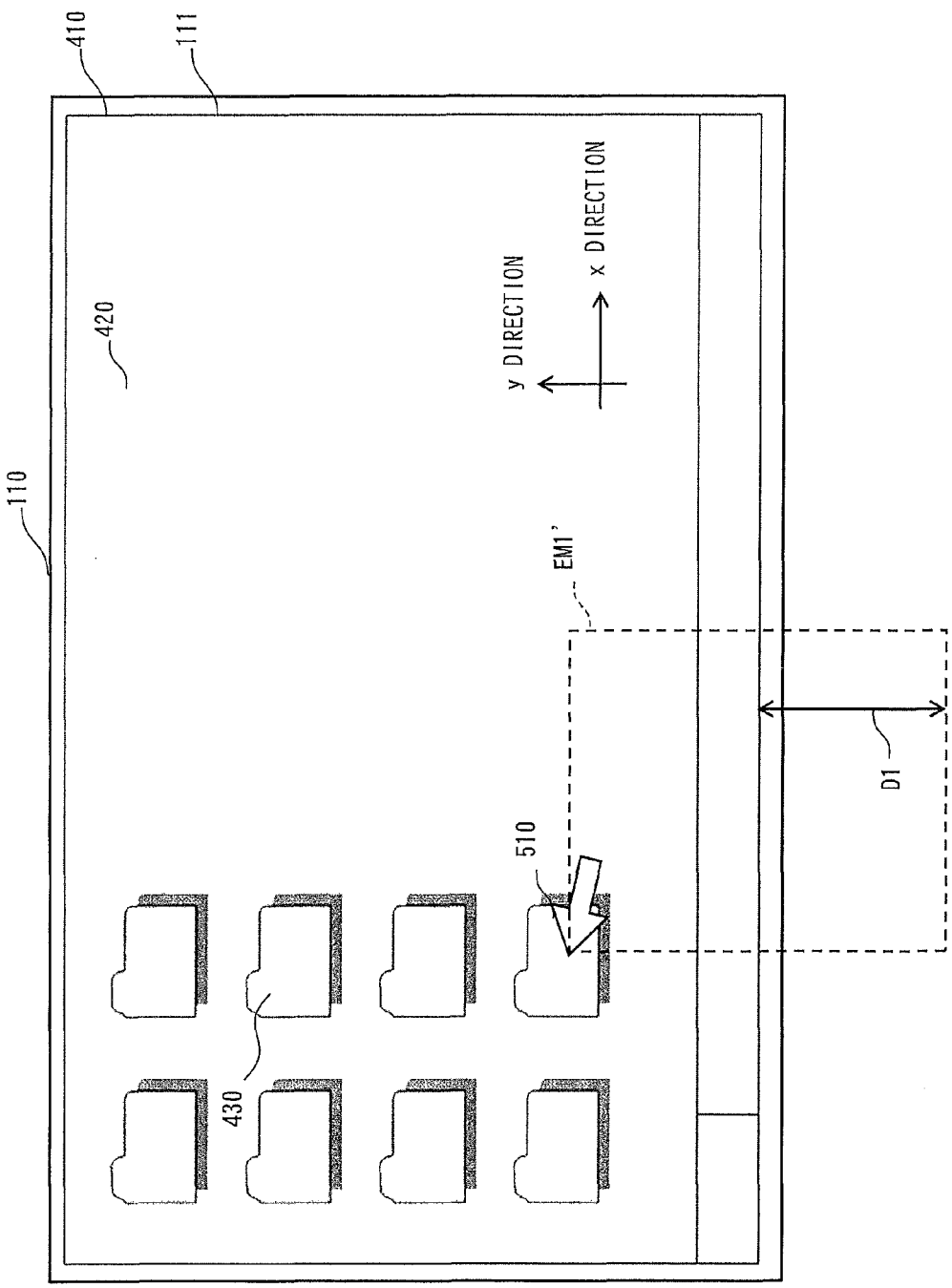

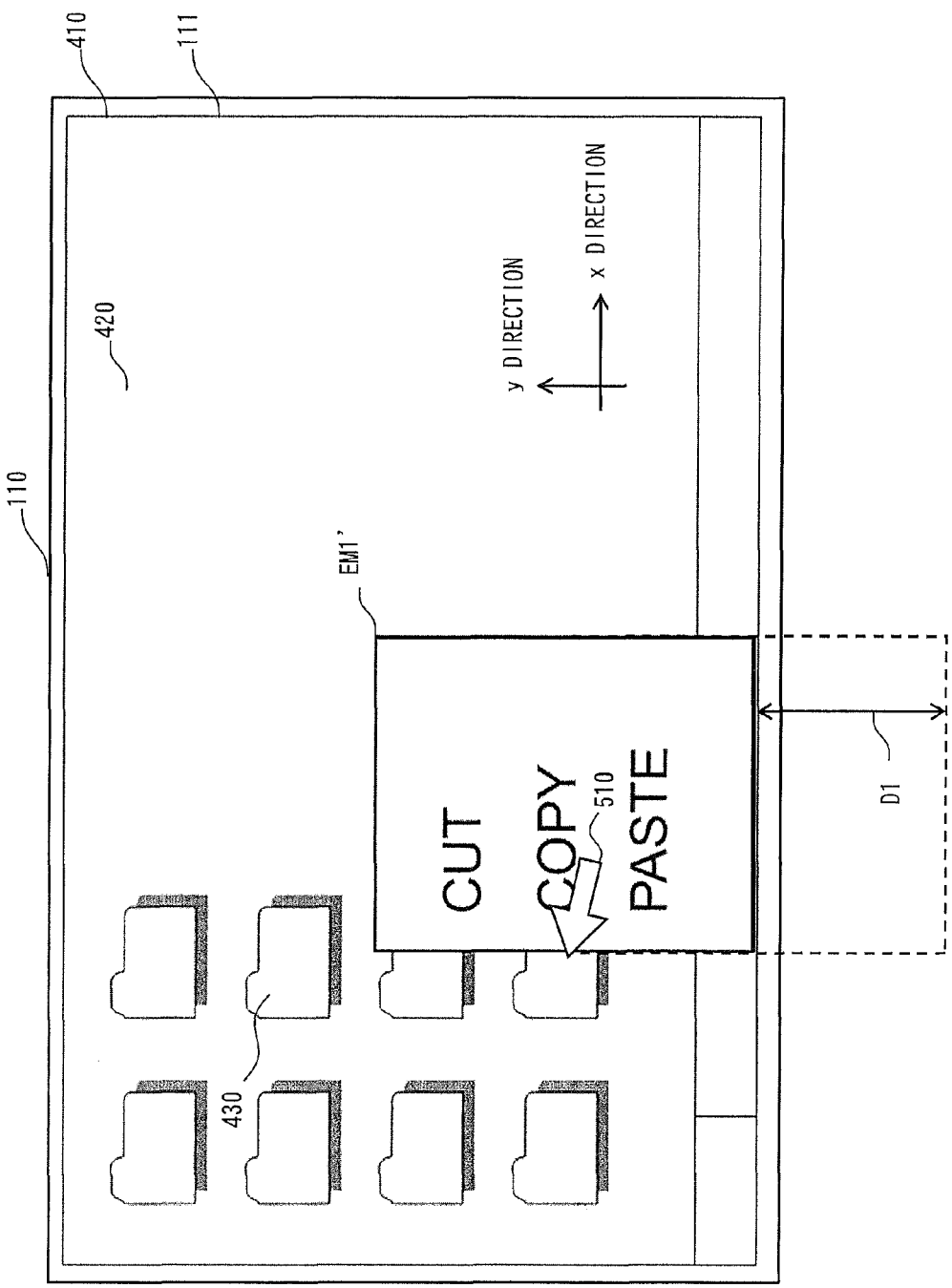

INFORMATION PROCESSING APPARATUS

BACKGROUND

1. Technical Field

The present invention relates to information processing apparatus capable of displaying an image by enlarging the image.

2. Related Art

In recent years, an increase in the resolution of display units has been advancing in information processing apparatuses such as notebook personal computers and desktop personal computers. However, as the increase in the resolution of display units advances, objects such as displayed characters and icons become smaller, and visibility with respect to the objects decreases. JP 4-359311 A discloses an information processing apparatus that is capable of addressing this problem. This information processing apparatus is capable of enlarging a display region when a user designates a position on image information displayed by its displaying means.

SUMMARY

The present disclosure provides information processing apparatus that enables a user to easily visually confirm a popup menu which is called from an enlarged display image.

An information processing apparatus according to the present disclosure includes a display device, an input device, and a processor. The display device is configured to display an image. The input device is configured to receive an operation on the image by a user. The processor is configured to cause the display device to display a predetermined popup menu, according to a predetermined operation to the input device for calling a popup menu. The processor is configured to cause the display device to superimpose and display, on the image, an enlarged image obtained by enlarging an enlargement target region which is a part of a region in the image, according to a predetermined operation for displaying the enlarged image of the enlargement target region. The When the input device receives an operation for calling a popup menu relevant to the enlarged image while the enlarged image of the enlargement target region is displayed in the display device, the processor causes the display device to stop displaying of the enlarged image of the enlargement target region, and causes the display device to display a first enlarged popup menu which is obtained by enlarging the popup menu relevant to the enlarged image.

According to the information processing apparatus in the present disclosure, a user is able to easily visually confirm a popup menu which is called from an enlarged display image.

BRIEF DESCRIPTION OF DRAWINGS

FIG. 4 shows a screen shot illustrating an example of the normal popup menu display processing.

FIG. 5A is a view for describing an enlargement target region in an example of enlargement display processing.

FIG. 5B is a view for describing an enlarged image in the example of enlargement display processing.

FIG. 14A is a view for describing an example of the magnification change processing.

FIG. 14B shows an example of the display by the magnification change processing.

DETAILED DESCRIPTION

Figure 1:
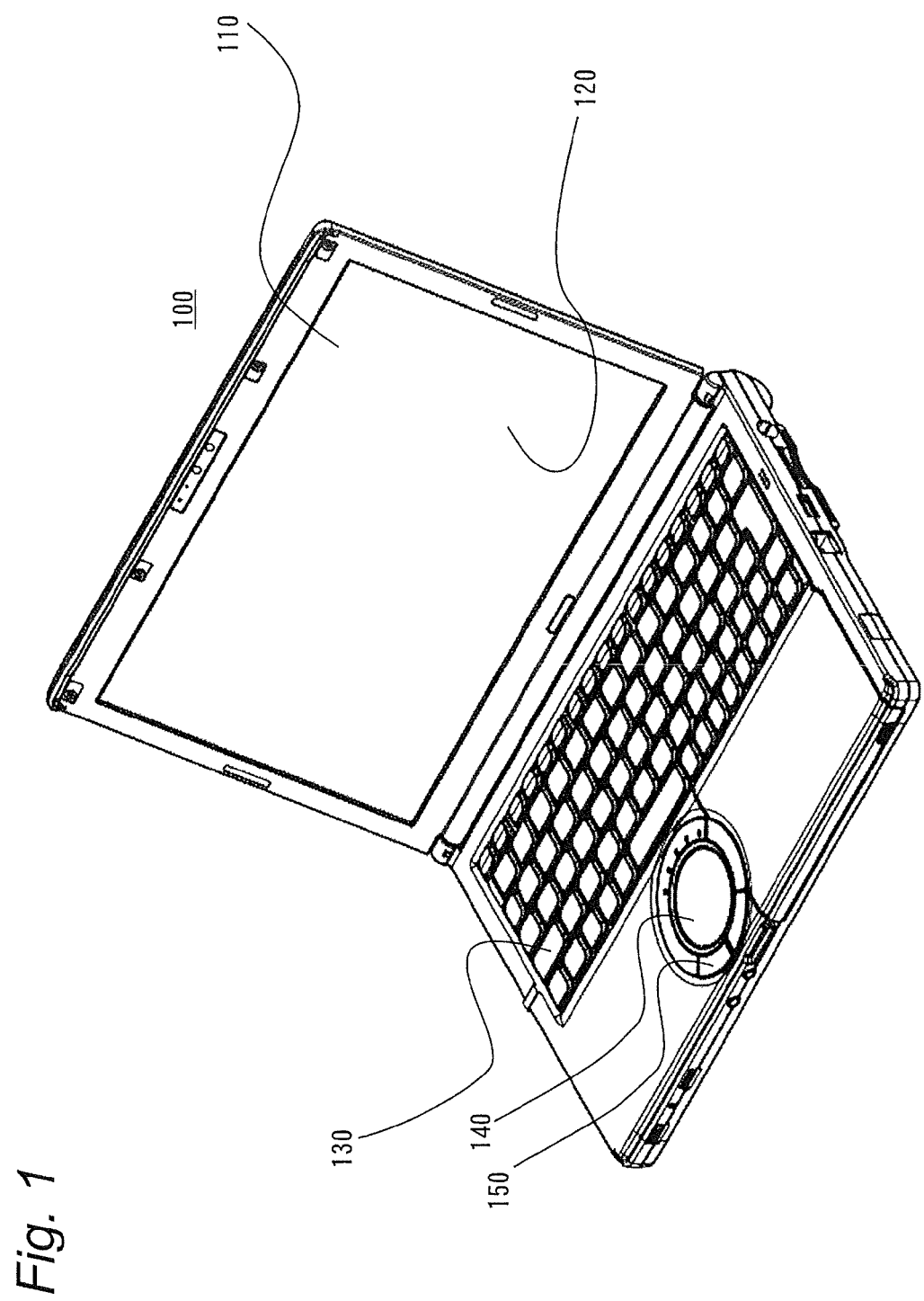
FIG. 1 is a view showing an external appearance of an information processing apparatus in a first embodiment.

Hereinafter, an embodiment is described in detail while referring to the drawings as appropriate. However, detailed descriptions are sometimes omitted when they are not required. For example, detailed descriptions of already well-known matters and repeated descriptions of substantially identical configurations are sometimes omitted. This has been done in order to avoid the following description from becoming unnecessarily redundant, and to facilitate understanding for persons skilled in the art.

It should be noted that the inventor(s) has provided the appended drawings and the following description in order for persons skilled in the art to sufficiently understand the present disclosure, not with the intention of thereby restricting the subject described in the claims.

(First Embodiment)

Hereinafter, a first embodiment is described with reference to FIGS. 1-14B.

1-1. Configuration

FIG. 1 is a view showing the external appearance of an information processing apparatus in the first embodiment.

An information processing apparatus 100 performs predetermined information processing based on an installed OS (operating system). The present embodiment describes an example in which the present disclosure has been applied to a notebook personal computer (PC) as an example of the information processing apparatus. The information processing apparatus to which the present disclosure is applied is not limited to a notebook personal computer. The present disclosure can also be applied to the information processing apparatus such as a laptop PC, a tablet PC, a smartphone, and the like.

The information processing apparatus 100 includes a display device 110, a touch panel 120, a keyboard 130, a touchpad 140, and buttons 150.

The display device 110 displays still images or moving images. A liquid crystal display is used as the display device 110 in the present embodiment, but different kinds of the display device can be used (e.g. organic electroluminescent display).

The touch panel 120 is a sensor that is integrally incorporated in the display device 110. A user of the information processing apparatus 100 is able to operate the information processing apparatus 100 by way of the touch panel 120 by touching the display surface of the display device 110.

The keyboard 130 receives key input from the user of the information processing apparatus 100.

The touchpad 140 receives input through touching operation from the user of the information processing apparatus 100. The user is able to operate the information processing apparatus 100 by touching the touchpad 140. The touchpad 140 is able to execute processing such as moving a cursor displayed on the display device 110, and issuing instructions with respect to objects designated by the cursor. Movement of the cursor is performed by moving a finger across the touchpad 140. The issuing of instructions is performed by tapping the touchpad 140.

The buttons 150 are input units with which a pressing operation is possible. The information processing apparatus 100 of the present embodiment includes a plurality of the buttons 150. The user of the information processing apparatus 100 is able to operate the information processing apparatus 100 by operating the buttons 150. Operations that can be executed by means of the buttons 150 include, for example, left-click and right-click operations, a double-click operation, and the like.

The touch panel 120, the keyboard 130, the touchpad 140 and the buttons 150 are able to function as input devices configured to receive an operation on the image by a user. Furthermore, the input device may be configured by a mouse (not shown), for example.

Figure 2:
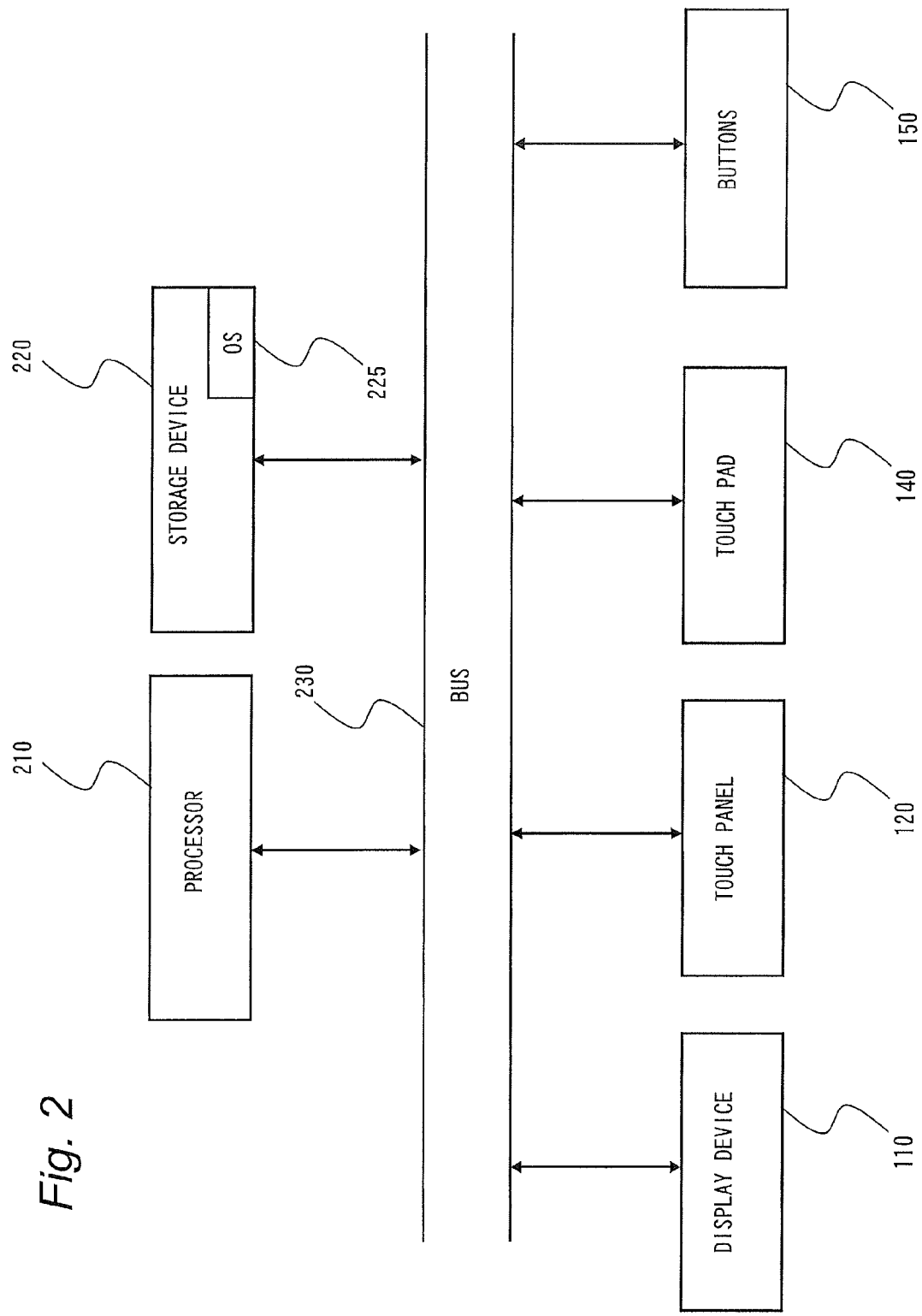
FIG. 2 is a block diagram showing the configuration of the information processing apparatus in the first embodiment.

FIG. 2 is a block diagram showing the configuration of the information processing apparatus in the first embodiment The information processing apparatus 100 further includes a processor 210, a storage device 220, and a bus 230.

The processor 210 executes programs stored in the storage device 220. The processor 210 controls the constituent elements configuring the information processing apparatus 100 by executing the programs. For example, by executing a predetermined program, the processor 210 causes the display device 110 to display image information stored in the storage device 220.

The storage device 220 temporarily or permanently stores data required for the information processing apparatus 100 to perform information processing. The storage device 220, for example, stores programs and numerical values to which the programs refer. As the storage device 220, a non-volatile memory or a HDD (hard disk drive) for example is used. An OS 225 is stored in the storage device 220. The OS 225 provides to the user a system which allows the program (software) to handle the constituent elements provided in the information processing apparatus 100. Furthermore, a program for enlargement display processing described hereinafter is stored in the storage device 220.

The bus 230 is a communication path for control signals and data transmitted and received by the constituent elements configuring the information processing apparatus 100. Control signals and data are transmitted and received among the constituent elements of the information processing apparatus 100 via the bus 230. In the present embodiment, the display device 110, the touch panel 120, the touchpad 140, the buttons 150, the processor 210, and the storage device 220 are connected to the bus 230.

Via the bus 230, the processor 210 transmits and receives various signals with the constituent elements configuring the information processing apparatus 100, and thereby controlling the constituent elements. For example, the touch panel 120 sends coordinate information to the processor 210 via the bus 230. The coordinate information is information relating to the coordinates of a position that the user has touched on the touch panel 120. The processor 210 executes a program using received coordinate information to generate various signals and image data. Generated signals are transmitted to the storage device 220 via the bus 230, and are stored as data in the storage device 220. Farther, generated image data is transmitted to the display device 110 via the bus 230. The display device 110 displays an image represented by the image data. It should be noted that, signals corresponding to information input by the user in the input device such as the keyboard 130, the touchpad 140, or the buttons 150 are also transmitted to the processor 210 via the bus 230.

1-2. Operation

An operation of the information processing apparatus 100 configured as described above will be described below.

Figure 3:
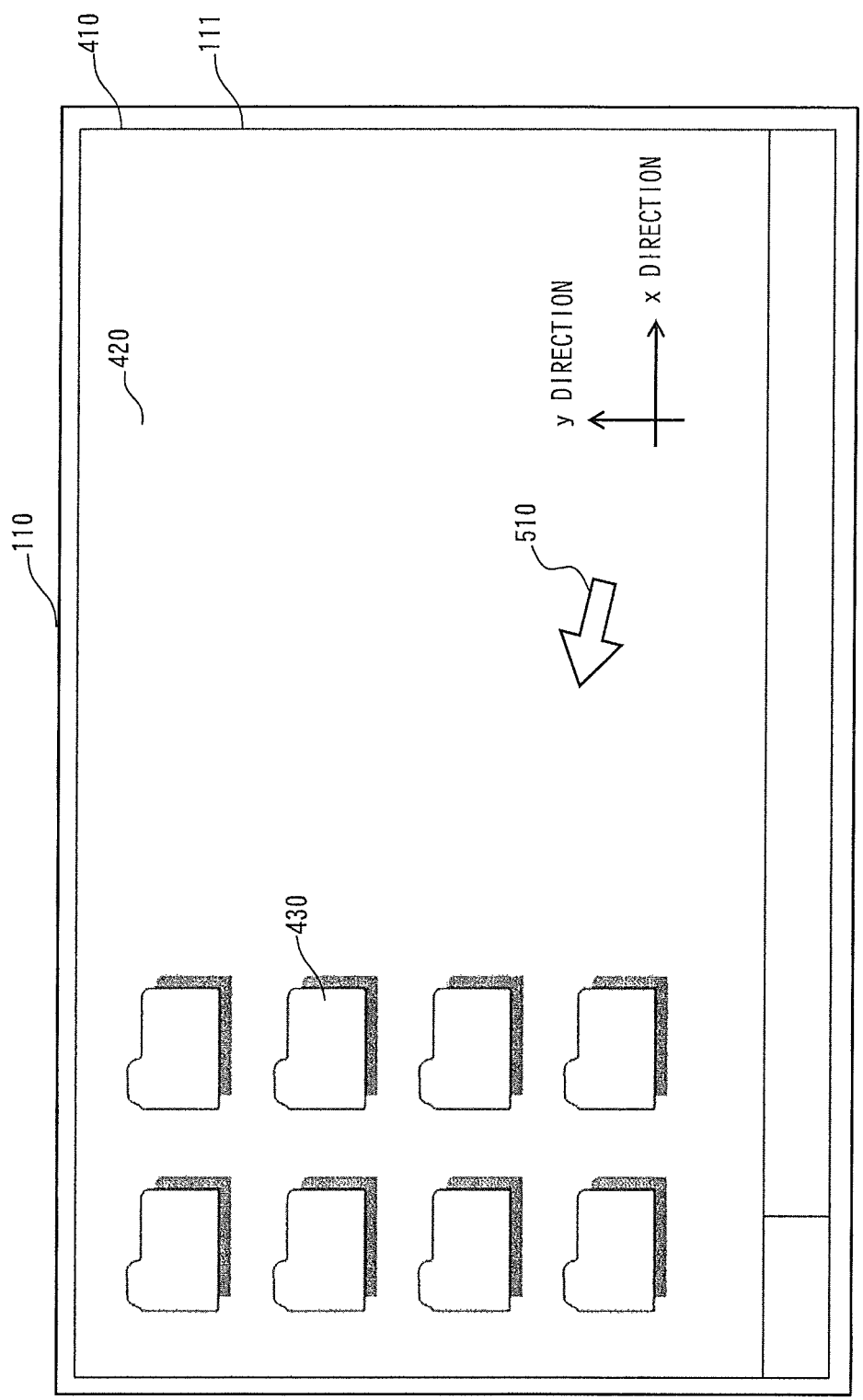
FIG. 3 shows a screen shot of an image in the first embodiment.

The processor 210 causes the display device to display an image. FIG. 3 shows a screen shot of the image. An image 410 is displayed by functions of the OS and the like. The image 410 includes a desktop 420 and an icon 430. As other examples of the image 410, there are pointed out a screen of a web browser, and a screen of paint software. Although the image 410 is displayed in a whole of a display region 111 of the display device 110 in the present embodiment, the image 410 may be displayed in only a part of the display region ill of the display device 110. In the present embodiment, a size of the image 410 is defined by a width and a height. A width direction of the image 410 and the display region 111 of the display device 110 is set as an x direction, and a height direction of the image 410 and the display region 111 of the display device 110 is set as a y direction.

The processor 210 performs normal popup menu display processing, according to a predetermined operation for the user to call a popup menu. The normal popup menu display processing is processing of displaying the popup menu relevant to input coordinates that are input from the input device, around the input coordinates on an image (the image 410, for example) displayed in the display device 110. The popup menus is a predetermined menu that has menu items relevant to the input coordinates.

FIG. 4 shows a screen shot illustrating an example of the normal popup menu display processing. In order to call a popup menu from the icon 430 shown in FIG. 3, the user moves a cursor 510 onto the icon 430, and right clicks the icon 430, for example. Then, the processor 210 performs the normal popup menu display processing, and displays a popup menu M1 as shown in FIG. 4. The popup menu M1 has menu items that are relevant to the icon 430, such as a menu item "copy" for copying a folder of the icon 430.

Further, the processor 210 performs enlargement display processing according to a user operation to the input device. The enlargement display processing is processing of superimposing and displaying, on an image that is displayed in the display device 110, an enlarged image obtained by enlarging a designated enlargement target region at a predetermined magnification. The enlargement target region is a region that becomes an enlargement display target, on the image (the image 410, for example) that is displayed in the display device 110.

FIGS. 5A and 5B show screen shots illustrating an example of the enlargement display processing. In order to display an enlarged image of a region including the icon 430, for example, the user inputs two points (coordinates of a point P1 and coordinates of a point P2) that sandwich the icon 430, and designates an enlargement target region R1, as shown in FIG. 5A. Then, the display device 110 superimposes and displays, on the image 410, an enlarged image E1 obtained by enlarging the enlargement target region R1, as shown in FIG. 5B.

When the coordinates inside the enlarged image E1 are input, the processor 210 then operates by regarding that the coordinates of a region of an enlargement source corresponding to the input coordinates are designated. Accordingly, the user double clicks the icon 440 of a folder in the enlarged image E1, for example, and can expand the folder.

In the case of calling a popup menu relating to the enlarged image E1, an inconvenience occurs if the normal popup menu display processing is performed. For example, when the user performs an operation for calling a popup menu from the icon 440 in the enlarged image E1 shown in FIG. 5B, the processor 210 regards that the coordinates on the icon 430 shown in FIG. 3 are designated, and the processor 210 attempts to perform the normal popup menu display processing. Then, the popup menu M1 (see FIG. 4) that is relevant to the icon 430 and the enlargement target region R1 which includes the icon 430 (see FIG. 5A) are superimposed with each other. Consequently, the normal popup menu display processing and the enlargement display processing compete with each other. As a result, there occurs such an inconvenience that an image of a popup menu that is partially enlarged is displayed, and readability of the popup menu decreases.

Therefore, in order to call the popup menu from the coordinates inside the enlarged image E1, the information processing apparatus 100 according to the present embodiment performs enlargement popup menu display processing. The enlargement popup menu display processing is processing of stopping a displaying of an enlarged display image and a displaying of an extended image of a relevant popup menu, when the input device has received an operation (a right click, for example) of calling a popup menu relevant to an enlarged display while displaying the enlarged display image such as an enlarged image.

Figure 6:
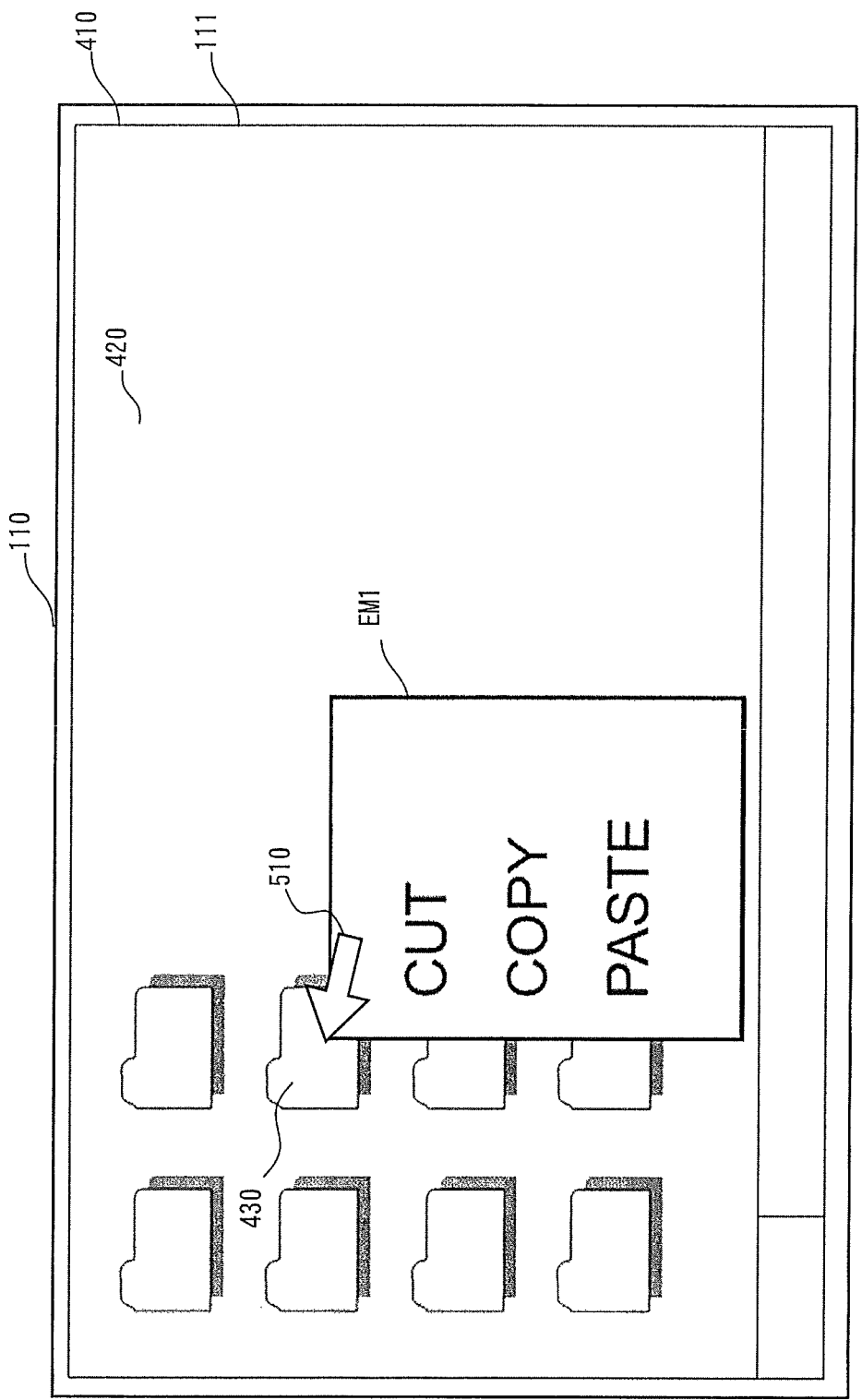
FIG. 6 shows a screen shot illustrating an example of the enlargement popup menu display processing.

FIG. 6 shows a screen shot illustrating an example of the enlargement popup menu display processing. In order to call the popup menu from the icon 440 in FIG. 5B, the user moves the cursor 501 to the icon 440, and right clicks the icon 440, for example. Then, the processor 210 performs the enlargement popup menu display processing, and erases the enlarged image E1 and displays an enlarged popup menu EM1 as shown in FIG. 6. The enlarged popup menu EM1 is a popup menu obtained by enlarging, at a predetermined magnification, the popup menu M1 in the normal popup menu display processing.

In this way, a menu display of high readability can be realized. The user visually confirms the enlarged image, to call the popup menu from the enlarged image. Therefore, because the enlarged popup menu obtained by enlargement at about the same magnification is displayed, the user can comfortably operate.

Hereafter, details of each processing will be described, in the order of the normal popup menu display processing, the enlargement display processing, and the enlargement popup menu display processing.

1-2-1. Normal Popup Menu Display Processing

Hereafter, the normal popup menu display processing will be described with reference to FIGS. 3, 4, and 7.

Figure 7:
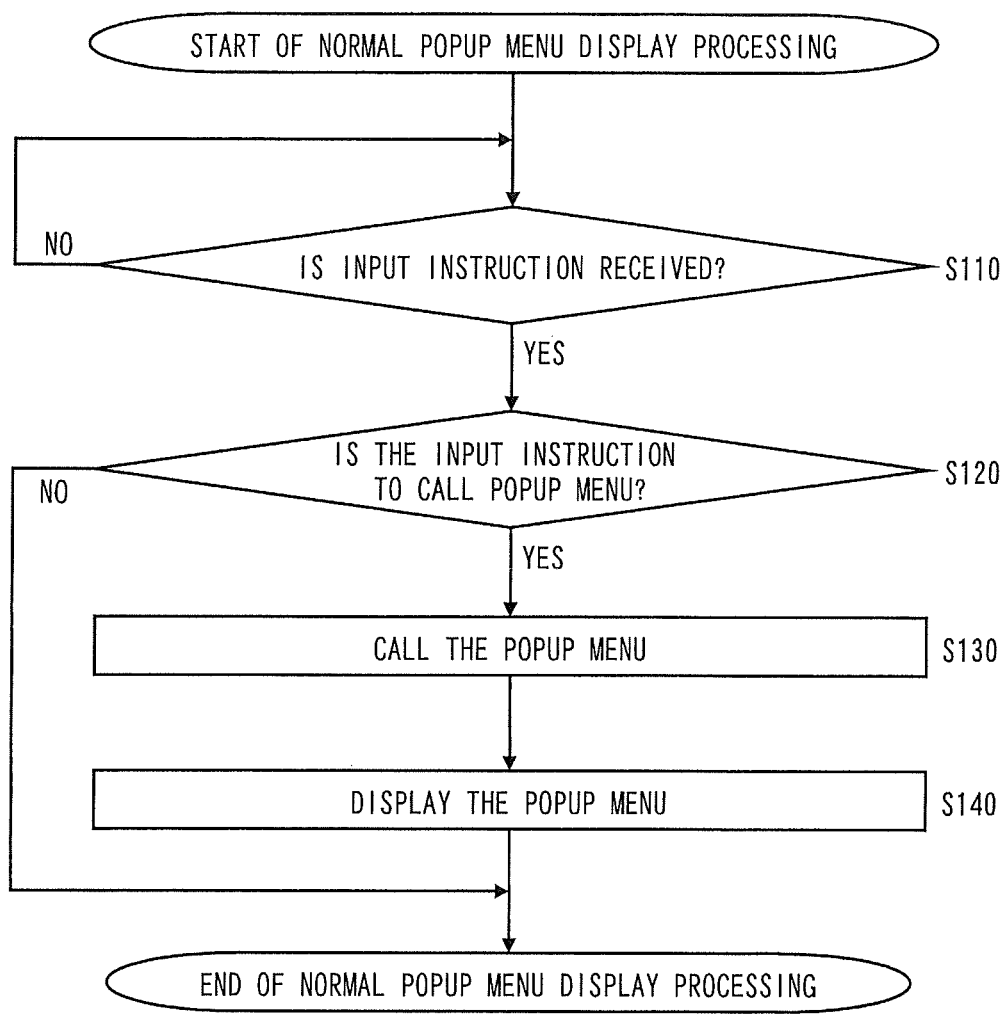
FIG. 7 is a flowchart for describing normal popup menu display processing according to the first embodiment.

FIG. 7 is a flowchart for describing the normal popup menu display processing according to a first embodiment.

Each processing in the flowchart of FIG. 7 is executed by the processor 210.

It is assumed that the normal popup menu display processing is started in a state shown in FIG. 3.

First, the processor 210 receives an input from the input device performed by the user or the like (step S110). The processor 210 waits for the input from the input device (NO in step S110).

As examples of inputs from the input device, there are a tap operation onto the touch panel 120, a tap operation to the touch pad 140, and a press operation to any one of the buttons 150.

Upon receiving the input from the input device (YES in step S110), the processor 210 decides whether the input operation is an instruction to call a popup menu (step S120). When the received input operation is the instruction to call a popup menu (YES in step S120), the processor 210 performs processing in step S130. The input operation of calling a popup menu is, for example, an operation of a right click in the Windows (registered trademark) OS system, or the operation to the touch panel 120 or the touch pad 140 as an operation equivalent to the right click.

On the other hand, when the received input operation is not the operation to call a popup menu (NO in step S120), the processor 210 ends the normal display processing of a popup menu, and performs processing according to the input operation.

In step S130, the processor 210 calls a popup menu. Specifically, the processor 210 reads data of the popup menu from the memory device 220. The popup menu is predefined in association with specific coordinates in the image 410 (for example, coordinates to which a display of the popup menu is designated). Therefore, there is a case where contents of a popup menu to be called are different depending on a position (for example, a position of the cursor 510 at the time when the cursor 510 is right clicked) on the image 410 to which the input operation is performed. For example, when the user right clicked the desktop 420 in the image 410 shown in FIG. 3, data of a popup menu including items of "alignment of icons" and the like are read. On the other hand, when the user right clicked the icon 430 of a folder, data of a popup menu including items of "copy of the folder" and the like are read.

Next, the processor 210 causes the display device 110 to display the read popup menu (step S140). A display position at which the display device 110 displays the popup menu is a position defined by the coordinates input by the input operation.

FIG. 4 shows an image obtained when the user right clicked the icon 430 using the input device in a state that the cursor 510 indicates the coordinates on the icon 430 of the folder. At this time, the processor 210 performs the normal popup menu display processing according to the coordinates indicated by the cursor 510. As shown in FIG. 4, the display device 110 displays the popup menu M1 near the coordinates that are indicated by the cursor 510. In the present embodiment, the popup menu M1 is arranged to be expanded from a base point, the coordinates indicated by the cursor 510, to a right lower direction.

1-2-2. Enlargement Display Processing

Hereafter, the enlargement display processing will be described with reference to FIGS. 3, 5A, 5B, and 8. The enlargement popup menu display processing is executed based on an assumption that a part of a region of an image (the image 410, for example) displayed by the display device 110 is being enlarged by the enlargement display processing.

Figure 8:
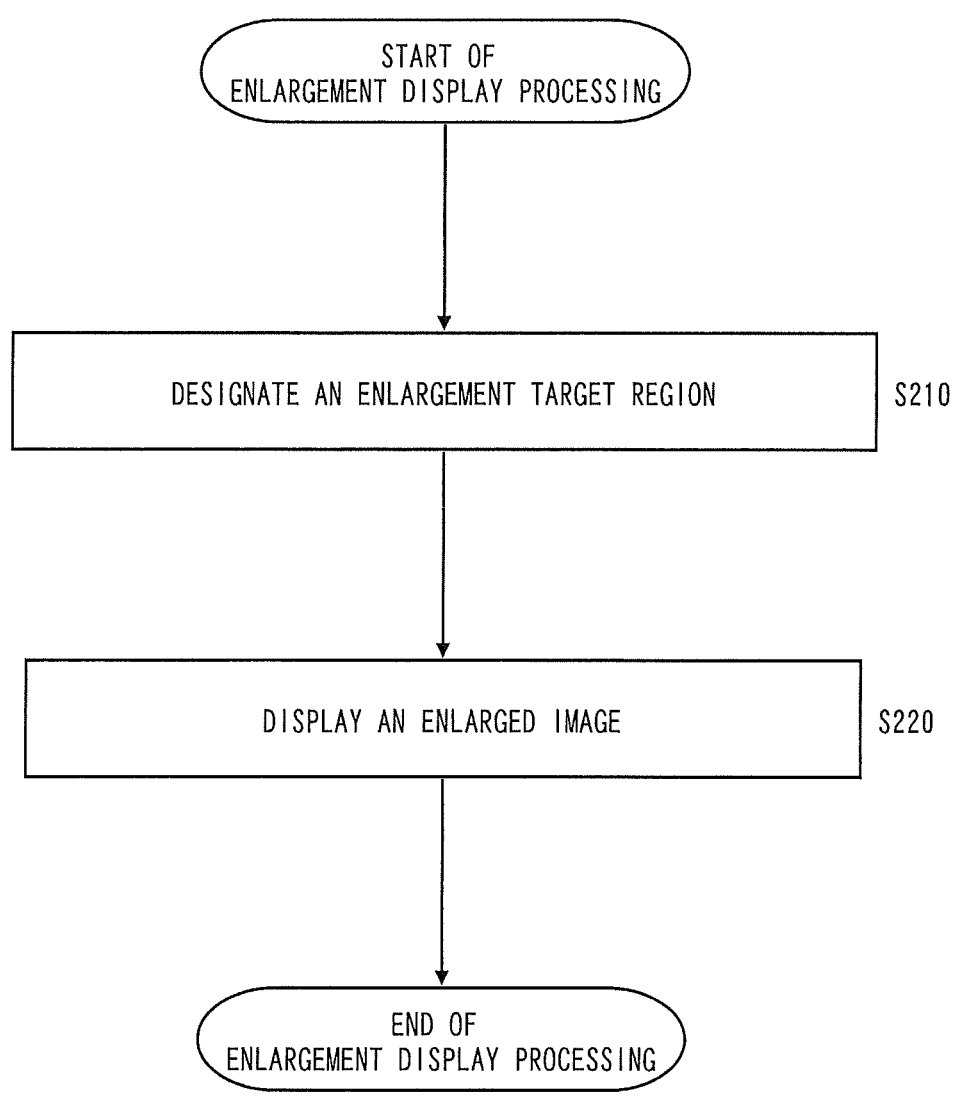
FIG. 8 is a flowchart for describing enlargement display processing according to the first embodiment.

FIG. 8 is a flowchart for describing the enlargement display processing according to the first embodiment.

Each processing of the flowchart in FIG. 8 is executed by the processor 210. The enlargement display processing may be started by an explicit execution of a predetermined program by the user, or may be started by a normal execution of a background processing function of the OS 225. It is assumed here that the image 410 is being displayed in the display device 110 as shown in FIG. 3.

First, the processor 210 receives designation of an enlargement target region (step S210). The enlargement target region is designated by an operation performed by the user or the like. The enlargement target region is a part of a region in the image 410. FIG. 5A shows a state that the enlargement target region according to the first embodiment is designated.

In the present embodiment, the enlargement target region R1 is designated by a touch operation to the touch panel 120 which the user designates the coordinates of the two points P1 and P2, for example.

Next, the processor 210 superimposes and displays, on the image 410, an enlarged image obtained by enlarging the enlargement target region designated in step S210 (step S220). Specifically, the processor 210 generates an enlarged image obtained by enlarging the enlargement target region at a predetermined magnification. The generated enlarged image is stored in the memory device 220.

FIG. 5B shows the enlarged image that is displayed by the enlargement display processing. The processor 210 superimposes and displays, on the image 410, the generated enlarged image E1 so that the center of the enlarged image E1 coincides with the center of the enlargement target region R1 (step S220).

When coordinates in the image enlarged by the enlargement display processing is designated from the input device, the processor 210 regards that the corresponding coordinates are designated in the enlargement target region of the enlargement source, and performs corresponding information processing. For example, when the icon 440 displayed in the enlarged image E1 is double clicked, the processor 210 regards that the icon 430 on the enlargement target region R1 is double clicked, and performs information processing corresponding to the double click of the icon 430.

Accordingly, the user can perform an operation similar to that operated to the image of the enlargement source, to the enlarged image. Therefore, the user can intuitively operate the information processing apparatus 100.

1-2-3. Enlargement Popup Menu Display Processing

In the information processing apparatus 100 according to the present embodiment, instruction can be also performed with the input device, to the inside of the enlarged image displayed by the enlargement display processing. For example, in FIG. 5B, the user can develop a folder included in the enlarged image E1, by double clicking the coordinates on the icon 440 of the folder. At this time, the processor 210 performs processing of replacing the instruction by the input device to the enlarged image E1, with the instruction to the enlargement target region R1.

Then, there is a risk of generating a problem when the instruction of calling the popup menu from the inside of the enlarged image E1 is designated. That is, when the popup menu which is related to the coordinates on the enlarged image E1 is called, usually, the popup menu M1 is displayed near the coordinates, as shown in FIG. 4. Accordingly, a part of the displayed popup menu M1 is superimposed on the enlargement target region R1 (see FIG. 5A). Therefore, there is a risk that only a part of the popup menu is displayed by enlargement. When only a part of the popup menu is enlarged, readability of a whole of the popup menu decreases.

Thus, in the present disclosure, the enlargement popup menu display processing is performed. In the enlargement popup menu display processing, the enlarged display of the enlargement target region is stopped, and further, the enlargement popup menu obtained by enlarging the popup menu is displayed, so that readability of the popup menu is improved.

Hereafter, details of the enlargement popup menu display processing will be described with reference to FIGS. 6 and 9.

Figure 9:
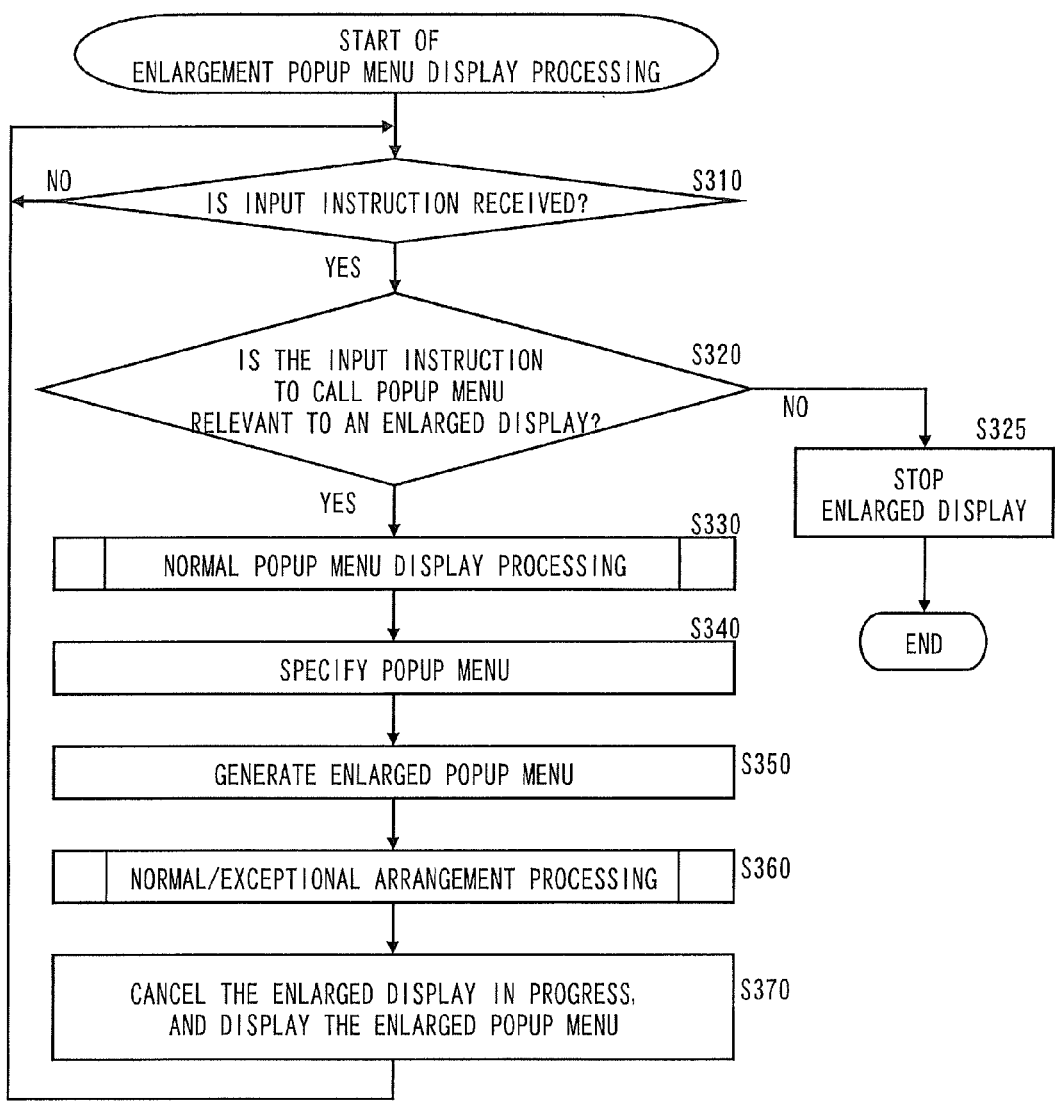
FIG. 9 is a flowchart for describing enlargement popup menu display processing.

FIG. 9 is a flowchart for describing the enlargement popup menu display processing.

When an enlarged image or an enlargement popup menu is being superimposed and displayed on the image 410 (that is, enlarged display is being carried out), the processor 210 starts the enlargement popup menu display processing.

First, the processor 210 receives an input to the information processing apparatus 100 from the user, via the input device (step S310). The user performs the input to the information processing apparatus 100 by using the input device.

Upon receiving the input from the input device (YES in step S310), the processor 210 decides whether the received input is (1) relevant to an enlarged display image and (2) a call operation of a popup menu, which is relevant to the enlarged display image (step S320). The call operation of a popup menu which is relevant to the enlarged display image is the call operation of a popup menu in a state that the coordinates inside the enlarged display image are specified, for example.

The enlarged display image includes the enlarged image that is displayed in step S220 of the enlargement display processing, and an image of an enlarged popup menu that is displayed by the processing in step S370 described later.

When the received input is not the input on the region of (1) the enlarged display image, or is not the call operation of (2) the popup menu (NO in step S320), the processor 210 stops displaying the enlarged display image (step S325). The stop of the enlarged display is executed by erasing the enlarged image of the enlargement target region, or by erasing the enlarged popup menu to display the popup menu of the enlargement source. In the state that the processing in step S325 is executed, the instruction that is input in step S310 is (1) the designation of coordinates at the outside of the enlarged display image, or (2) the operation that is not the call of a popup menu, for example. In such a case, visibility of the image 410 can be increased by stopping the enlargement of the enlargement target region or the enlarged popup menu.

On the other hand, when the received input in step S310 is (1) the input on the region of the enlarged display image, and is (2) the call operation of the popup menu (YES in step S320), the processor 210 regards that the coordinates of the enlargement source of the enlarged display image are designated, and executes the normal popup menu display processing (step S330). The normal popup menu display processing is as described above.

Next, the processor 210 specifies a popup menu generated by the normal popup menu display processing (step S340). Specifically, the processor 210 specifies the popup menu, by enquiring the OS 225 about a location of a window that has an attribute of the popup menu. The OS 225 manages each element that is displayed in the display device 110, in a predetermined unit of a window and the like. The processor 210 confirms the window in which the popup menu is displayed among windows managed by OS 225. The popup menu that is generated by the processing in step S340 should be specified by the processor 210, and is not essential to be actually displayed. For example, the processor 210 may use data of a popup menu that is read by the normal popup menu display processing.

Next, the processor 210 generates an enlarged popup menu obtained by enlarging the specified popup menu (step S350). Specifically, the processor 210 first acquires information of the coordinates in which the popup menu is displayed, and a size of the coordinates. The processor 210 generates an enlarged popup menu obtained by enlarging the popup menu at a predetermined magnification, based on the acquired information.

Next, the processor 210 performs normal/exceptional arrangement processing (step S360). The normal/exceptional arrangement processing is processing of determining a display method of arrangement and a magnification of the generated enlarged popup menu, as described in detail later. In the normal/exceptional arrangement processing, the processor 210 decides whether the enlarged popup menu that is arranged at a predetermined specific position can be within the display region of the display device 110. The specific position is a predetermined position that corresponds to the popup menu display position generated by the normal popup menu display processing in step S330.

When the enlarged popup menu can be within the display region at the specific position, the processor 210 displays the enlarged popup menu arranged at the specific position (the normal arrangement processing). On the other hand, when the enlarged popup menu cannot be within the display region at the specific position, the processor 210 adjusts the position and/or the magnification of the enlarged popup menu, as described in detail later (the exception arrangement processing). In the present example, it is assumed that the normal arrangement processing has been performed.

Next to the processing in step S360, the processor 210 causes the display device 110 to stop the enlarged display in progress, and causes the display device 110 to display the arranged enlarged popup menu. The enlarged display in progress includes displaying the enlarged image obtained by enlarging the enlargement target region, and displaying the enlarged popup menu obtained by enlarging the popup menu. The processor 210 stops the enlarged display in progress, in a similar manner to that of the processing in step S325. As described later, there is a case where a call operation of calling a popup menu from the inside of the enlarged popup menu is further performed. In such a case, the processor 210 stops the enlarged display of the popup menu that is displayed at the beginning, and performs an enlarged display of a new generated popup menu.

By the normal arrangement processing (step S360), the enlarged popup menu EM1 is displayed near the coordinates indicated by the cursor 510, as shown FIG. 6. In the present embodiment, the enlarged popup menu EM1 is arranged so as to be expanded from a base point, the coordinates indicated by the cursor 510 to a right lower direction. That is, the specific position where the enlarged popup menu EM1 is displayed is the same as the display position of the popup menu M1 of the enlargement source. The specific position of the enlarged popup menu EM1 in the present disclosure is not necessarily required to be the same as the display position of the popup menu M1. The specific position is defined by coordinates on the enlargement target region corresponding to designated coordinates on the enlarged image for calling the first enlarged popup menu.

For example, in the case of displaying the enlarged popup menu EM1, the enlarged popup menu EM1 may be displayed in the coordinates obtained by adding a predetermined calculation to the coordinates indicated by the cursor 510.

Following the processing in step S370, the processor 210 repeatedly executes the processing in step S310. Accordingly, when the call operation of the popup menu which is related to the displayed enlarged popup menu (a first enlarged popup menu) is performed, it is possible to display the called popup menu as a second enlarged popup menu. Hereafter, descriptions will be made with reference to FIGS. 10, 11A, and 11B.

Figure 10:
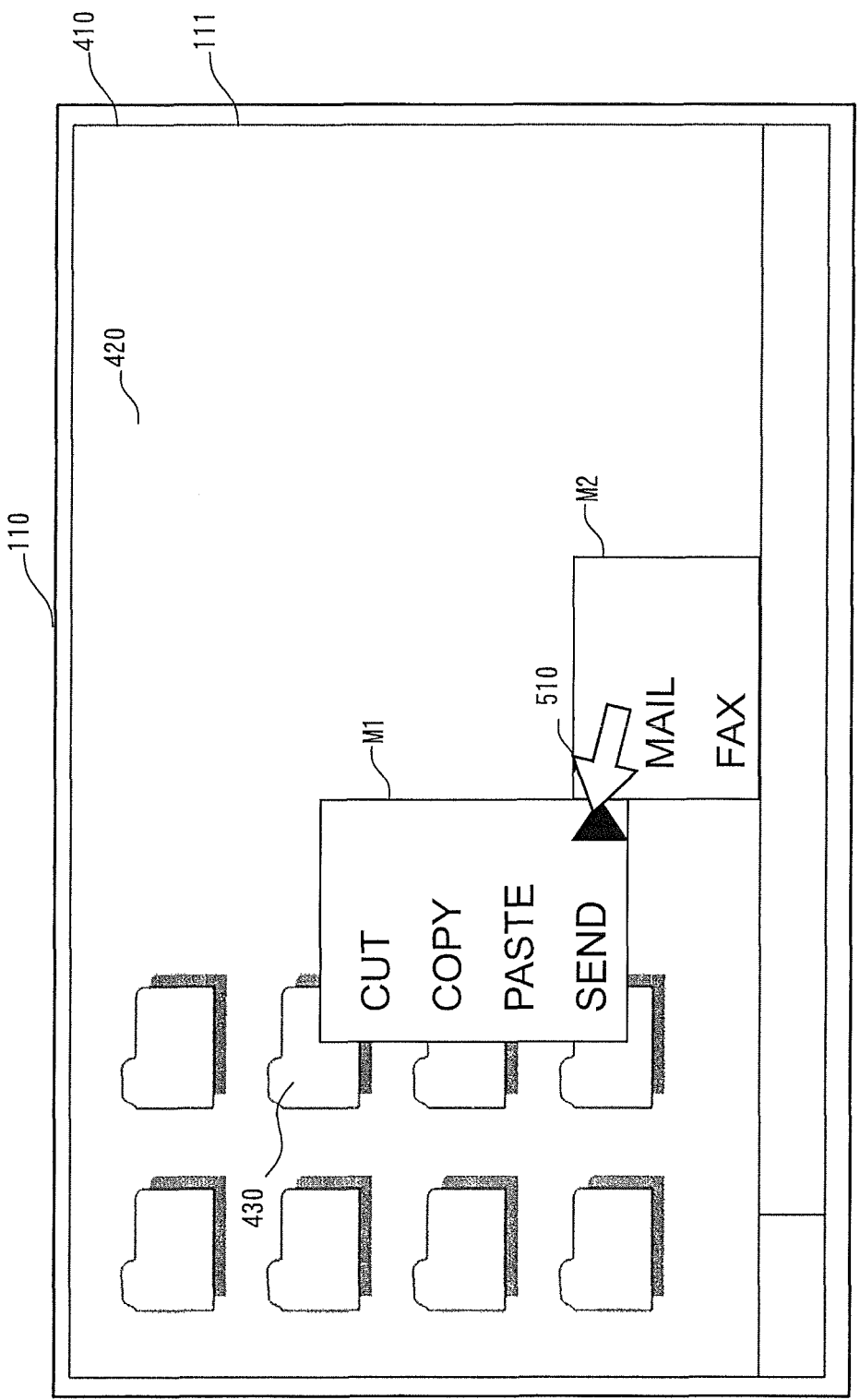
FIG. 10 shows a screen shot illustrating a popup menu that is called at a second time, in the normal popup menu display processing.

FIG. 10 shows a screen shot illustrating a popup menu that is called at a second time, in the normal popup menu display processing. In FIG. 10, it is assumed that a display of the enlarged image is not being performed. As shown in FIG. 10, the popup menu M1 that is called at a first time has a menu item of "send" that further calls a popup menu. For example, following the user operation of matching the cursor 510 onto the menu item of the "send", the processor 210 performs the normal popup menu display processing, and displays a second popup menu M2.

Figure 11A:
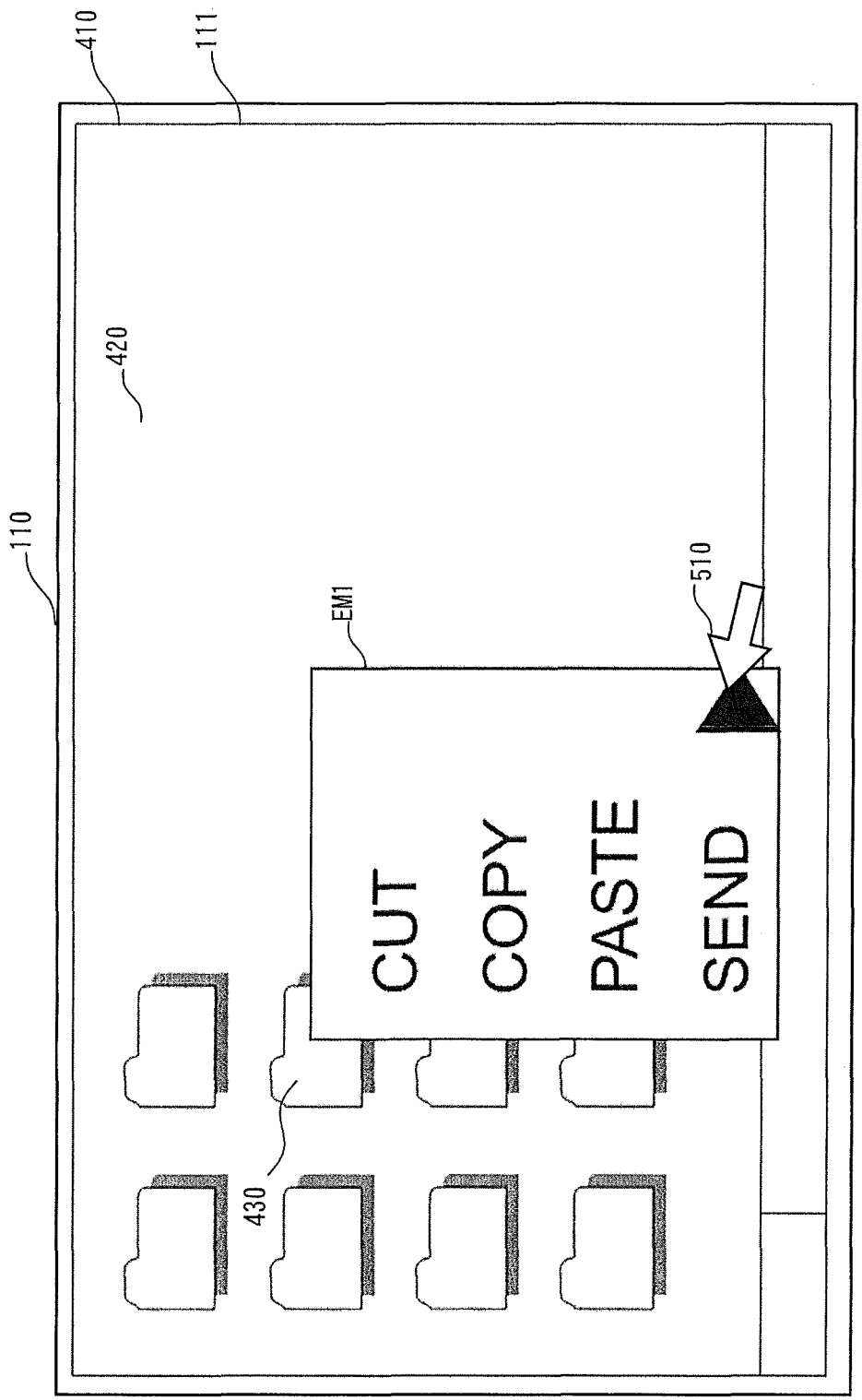
FIG. 11A shows a screen shot illustrating an example of calling the second popup menu in the enlargement popup menu display processing.

FIG. 11A shows a screen shot illustrating an example of calling the second popup menu in the enlargement popup menu display processing. In FIG. 11A, the enlarged popup menu (the first enlarged popup menu) EM1 obtained by enlarging the popup menu M1 shown in FIG. 10 is illustrated. When the user matches the cursor 510 onto the menu item of "send", the processor 210 executes each processing of the enlargement popup menu display processing, again (step S310).

Figure 11B:
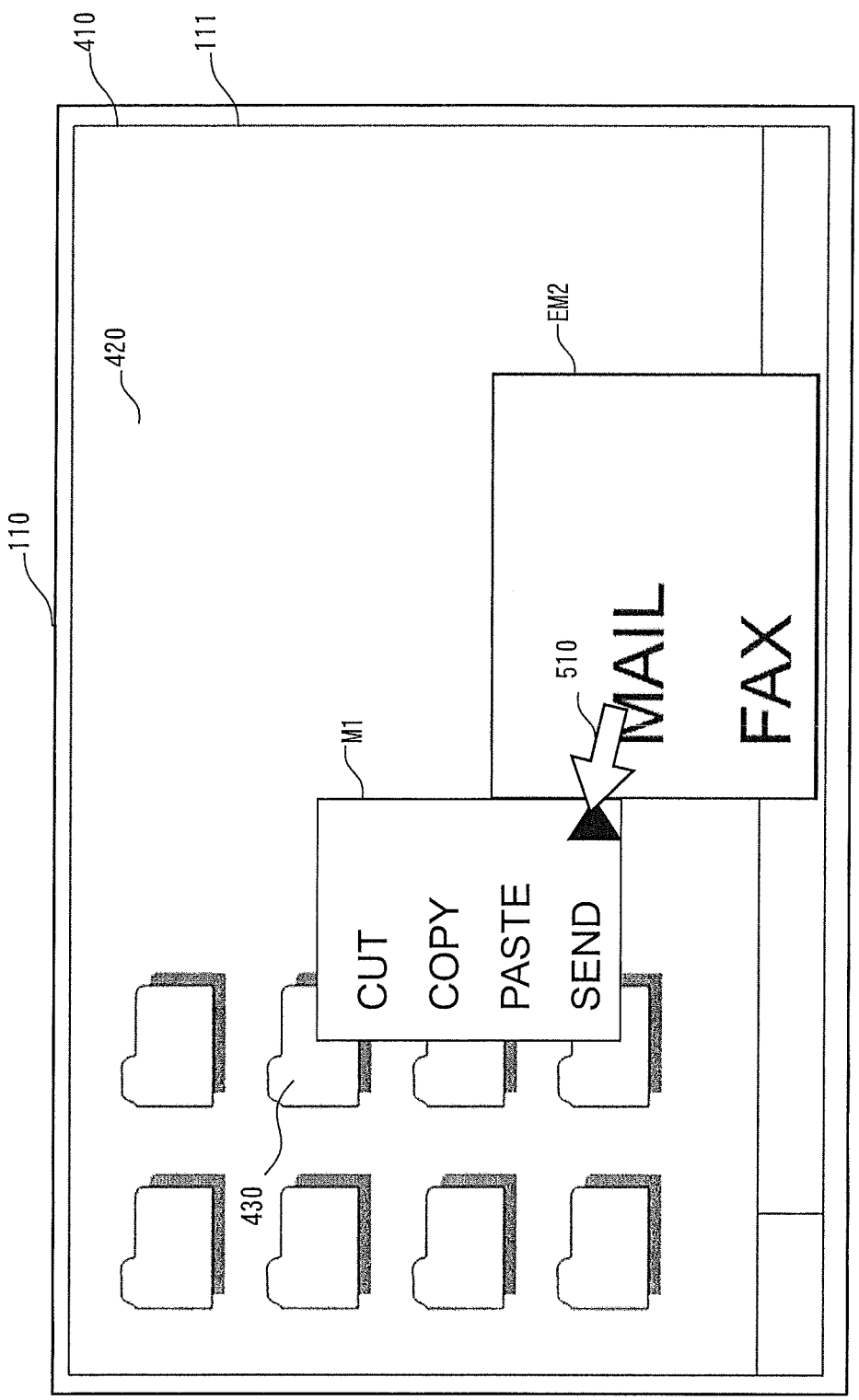
FIG. 11B shows a screen shot illustrating an example of carrying out an enlarged display of the second popup menu which is called from the enlarged popup menu.

FIG. 11B shows a screen shot illustrating an example of carrying out an enlarged display of the second popup menu which is called from the enlarged popup menu shown in FIG. 11A. In FIG. 11B, by the processing in step S370, the enlarged display for the first enlarged popup menu EM1 is stopped, and the normal popup menu M1 is displayed. Further, in FIG. 11B, by the processing in step S370, the enlarged popup menu (the second enlarged popup menu) EM2 obtained by enlarging the second popup menu M2 shown in FIG. 10 is displayed.

In this way, when the call operation of a popup menu is further performed from the first enlarged popup menu which is being displayed in the display device 110, the processor 210 stops the enlarged display of the first enlarged popup menu, and displays the second enlarged popup menu. Accordingly, among the popup menus before and after the calling, the popup menu having new information attracts attention of the user, displayed by enlargement. Therefore, the user can comfortably perform operation.

1-2-3-1. Normal/Exceptional Arrangement Processing

The normal/exceptional arrangement processing (step S360) in the flowchart in FIG. 9 will be described with reference to FIGS. 12, 13, 14A, and 14B.

Figure 12:
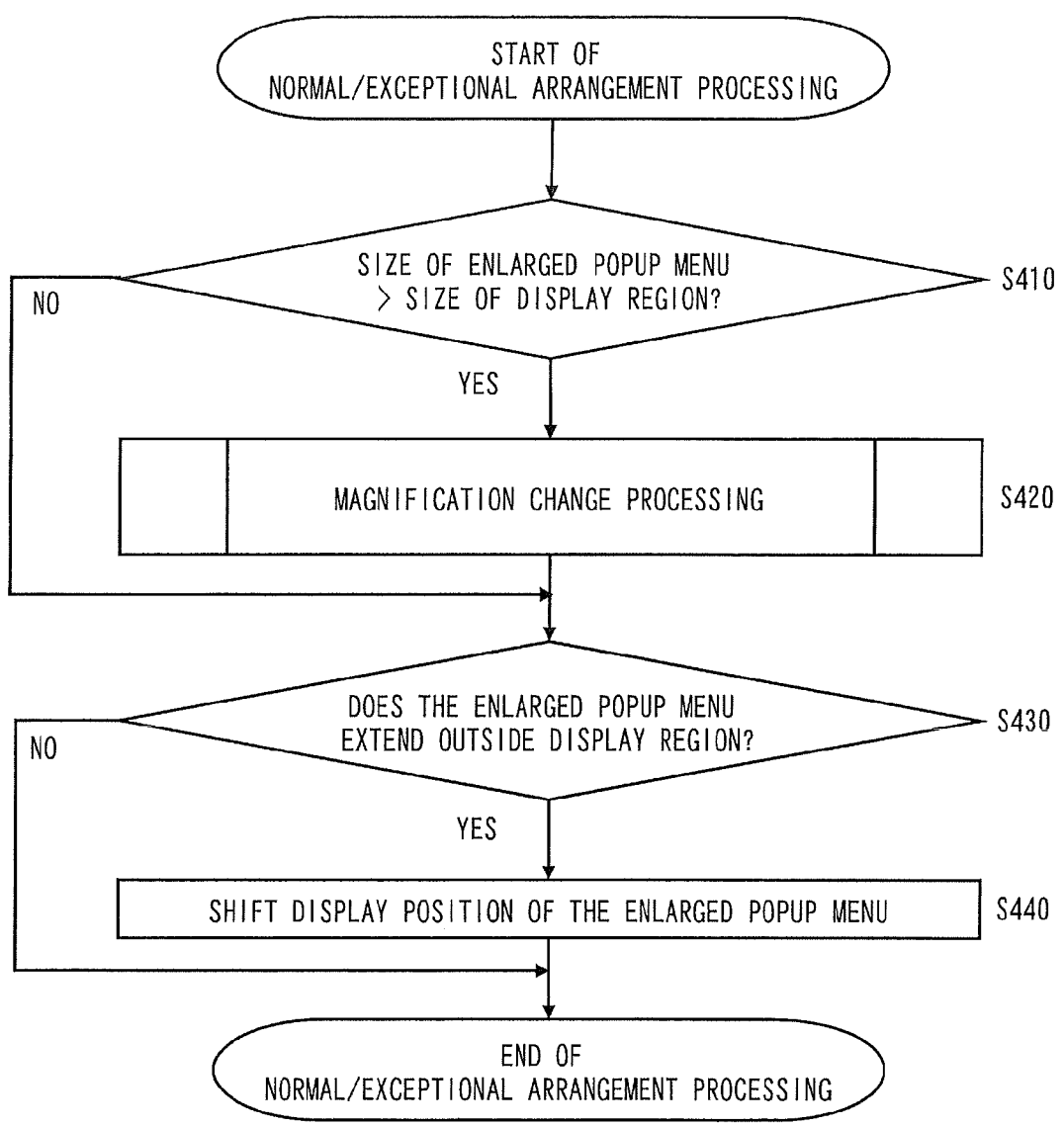
FIG. 12 is a flowchart for describing normal/exceptional arrangement processing according to the first embodiment.

FIG. 12 is a flowchart for describing the normal/exceptional arrangement processing according to the first embodiment.

In the following description, there is a case where a magnification for enlarging a popup menu and a position of displaying an enlarged popup menu are different from those of the example shown in FIG. 6.

The processor 210 first compares a size of the enlarged popup menu generated by the processing in step S350 with a size of the display region 111 of the display device 110 (step S410). Specifically, the processor 210 compares a height of the enlarged popup menu with a height of the display region 111 of the display device 110. For example, there is a case where because a predetermined magnification that has been used to generate the enlarged popup menu in step S350 is larger than the size of the popup menu of the enlargement source, a size of the generated enlarged popup menu exceeds the size of the display region 111 of the display device 110. When the size of the enlarged popup menu is equal to or smaller than the size of the display region 111 of the display device 110 (NO in step S410), the processor 210 ends the processing and proceeds to step S430.

On the other hand, when the size of the enlarged popup menu is larger than the display region 111 of the display device (YES in step S410), the processor 210 performs magnification change processing (step S420).

Figure 13:
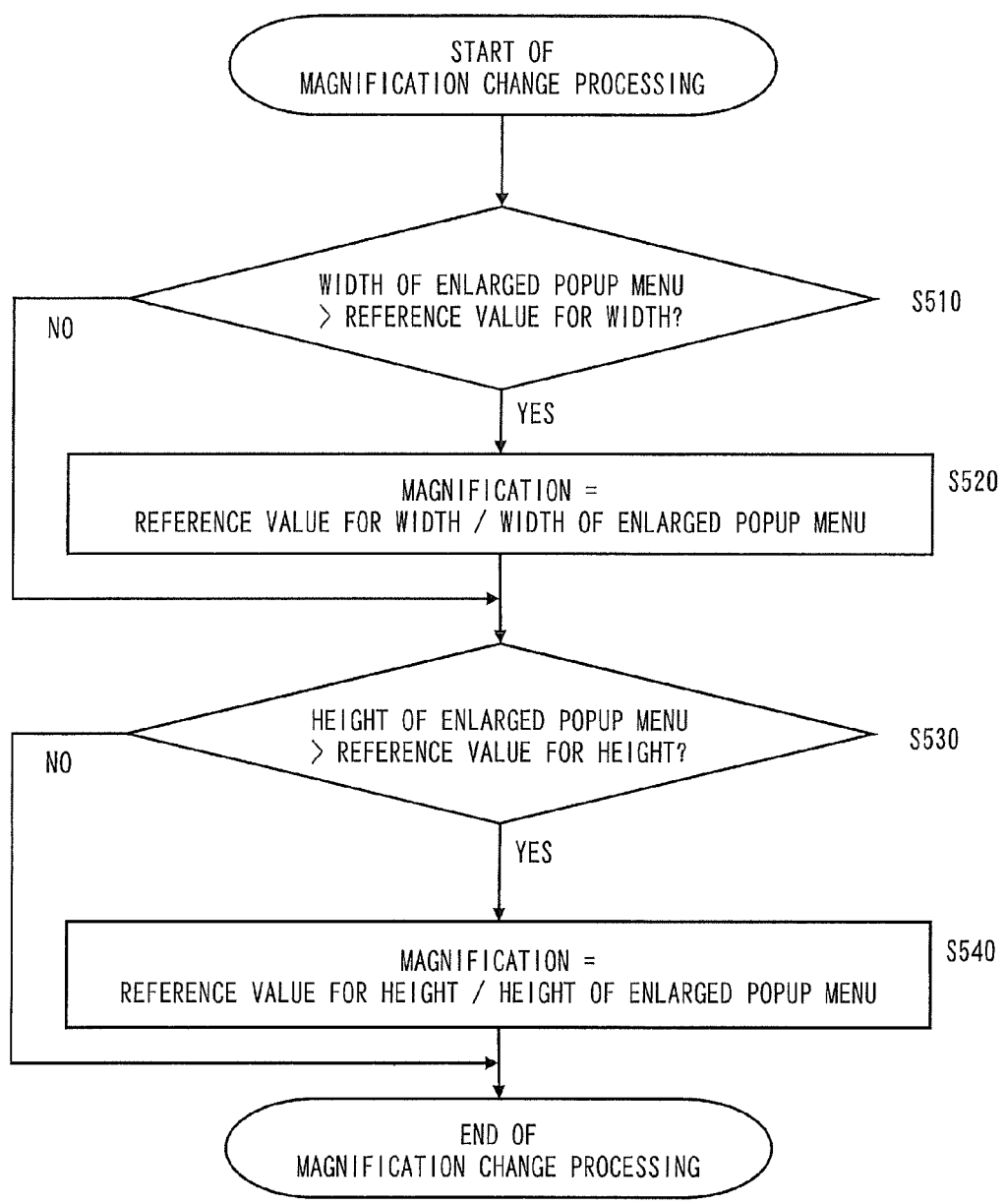
FIG. 13 is a flowchart for describing magnification change processing according to the first embodiment.

FIG. 13 is a flowchart for describing the magnification change processing according to the first embodiment.

First, the processor 210 performs a comparison decision of comparing between a width of the enlarged popup menu generated in step S350 and a reference value for width (step S510). The reference value for width is set to the width of the display region 111 of the display device 110, for example. This comparison is performed in a pixel unit, for example.

When the width of the enlarged popup menu is larger than the reference value for width (YES in step S510), the processor 210 changes the magnification to be used for generating the enlarged popup menu (step S520). The processor 210 calculates a changed magnification, by dividing the reference value for width by the width of the enlarged popup menu. On the other hand, when the width of the enlarged popup menu is equal to or smaller than the reference value for width (NO in step S510), the processor 210 performs the processing in step S530, without changing the magnification.

Accordingly, the width of the enlarged popup menu obtained by enlarging at the changed magnification becomes equal to the width of the display region 111 of the display device 110. When an edge of the enlarged popup menu coincides with an edge of the display region 111 of the display device 110, there is a case where an input operation to the inside of the image 410 displayed in the display device 110 is limited. Therefore, in order to avoid the input operation to the image 410 from being limited, the processor 210 may change the magnification to a value smaller than the calculated value. Further, in order to avoid the operation to the image 410 from being limited, the reference value for width may be set to a value smaller than the width of the display region 111 of the display device 110.

Next, the processor 210 performs a comparison decision of comparing between a height of the enlarged popup menu and a reference value for height (step S530). The reference value for height is set to the height of the display region 111 of the display device 110, for example. This comparison is performed in a pixel unit, for example. When the magnification is changed by the processing in step S520, a target of comparison decision in step S530 is an enlarged popup menu that is generated based on the changed magnification.

When the height of the enlarged popup menu is larger than the reference value for height (YES in step S530), the processor 210 changes the magnification to be used for generating the enlarged popup menu (step S540). The processor 210 calculates a changed magnification, by dividing the reference value for height by the height of the enlarged popup menu. On the other hand, when the height of the enlarged popup menu is equal to or smaller than the reference value for height (NO in step S540), the processor 210 does not change the magnification.

Accordingly, the height of the enlarged popup menu obtained by enlarging at the changed magnification becomes equal to the height of the display region 111 of the display device 110. When an edge of the enlarged popup menu coincides with an edge of the display region 111 of the display device 110, there is a case where an input operation to the inside of the image 410 displayed in the display device 110 is limited. Therefore, in order to avoid the input operation to the image 410 from being limited, the processor 210 may change the magnification to a value smaller than the calculated value. Further, in order to avoid the operation to the image 410 from being limited, the reference value for height may be set to a value smaller than the height of the display region 111 of the display device 110.

After the setting of the magnification is completed as described above, the processor 210 ends the magnification change processing, and proceeds to step S430 of the normal/exceptional arrangement processing.

Referring back to FIG. 12, in step S430, the processor 210 performs shift processing for adjusting the position of the enlarged popup menu so that the enlarged popup menu can be within the display region of the display device 110. Specifically, the processor 210 first decides whether the enlarged popup menu can be within the display region 111 of the display device 110 in the case of arranging the enlarged popup menu at the specific position.

By the magnification change processing in step S420, a size of the enlarged popup menu is equal to or smaller than that of the display region 111 of the display device 110. However, depending on the position where the enlarged popup menu is arranged, there is a case where a part of the enlarged popup menu extends outside the display region 111 of the display device 110. For example, in the present embodiment, the enlarged popup menu EM1 is arranged so as to be expanded from a base point, the coordinates indicated by the cursor 510 to a right lower direction, as shown in FIG. 6. Then, when the enlargement popup menu display processing is performed by designating coordinates that are relatively at a right side or a lower side in the display region 111 of the display device 110, there is a risk that the enlarged popup menu extends outside the display region 111 of the display device 110. Hereafter, such an example will be described in detail with reference to FIGS. 14A and 14B.

In the example shown in FIG. 14A, a position that is indicated by the cursor 510 to call the popup menu is located at a lower side than that of the example shown in FIG. 6. Therefore, at the above specific position, an enlarged popup menu EM1' extends outside the display region 111 of the display device 110 to a lower side (that is, to a negative y direction) by a distance D1. In FIG. 14A, the region EM1' indicated by a broken line shows an enlarged popup menu that is virtually arranged.

At the above specific position, the enlarged popup menu extends outside the display region 111 of the display device 110. Therefore, the processor 210 performs processing of shifting the display position of the enlarged popup menu from the above specific position in the processing in step S440. Specifically, as shown in FIG. 14B, the processor 210 shifts the enlarged popup menu EM1', by a extending distance D1, along a direction opposite to the extending direction (that is, along a positive y direction). When the enlarged popup menu extends outside the display region of the display device 110, to an upside, a right side, and a left side, the processor 210 similarly performs the processing of shifting the enlarged popup menu to a direction opposite to the extending direction. Accordingly, because the enlarged popup menu is displayed by being within the display region 111 of the display device 110, visibility of the user improves.

By shifting the specific position of the enlarged popup menu as in the example shown in FIGS. 14A and 14B, there is a case where an edge of the enlarged popup menu coincides with an edge of the display region 111 of the display device 110. As described above, when the edge of the enlarged popup menu coincides with the edge of the display region 111 of the display device 110, there is a risk that the operation to the image 410 is limited. Therefore, in order to avoid the input operation to the image 410 from being limited, the processor 210 may shift the specific position of the enlarged popup menu, to a position opposite to the extending direction, by a distance larger than the extending portion by a predetermined size.

After the shift operation of the enlarged popup menu is completed as described above, the processor 210 ends the normal/exceptional arrangement processing.

After ending the normal/exceptional arrangement processing, the processor 210 performs the processing in step S370 of the enlargement popup menu display processing.

In the first embodiment, the normal/exceptional arrangement processing has been described using a whole (pixel units) of the display region 111 of the display device 110. However, the description is an example. Therefore, in place of a whole of the display region 111 of the display device 110 a part of the display region 111 of the display device 110 may be used. A part of the display region of the display device is not necessarily limited to a display range or a valid pixel of the display device. A part of the display region of the display device may be defined as one section on not only physical screens but also logical screens. For example, a window provided by the OS, a predetermined image, and a screen in which a display range is defined by a black frame may be used as part of the display region of the display device, as application examples of the present disclosure. Hence, the region of the image 410 can be used as a part of the display region of the display device for reference of the decision in the normal/exceptional arrangement processing, for example.

For example, the processor may display the enlarged popup menu in a region (such as a window) of a part of the display region 111 of the display device 110. Then, when any part of the enlarged popup menu extends outside the region of a part of the display region 111 of the display device 110 with the enlarged popup menu arranged at the specific position, the processor 210 may shift the position of the enlarged popup menu so that whole of the enlarged popup menu is within the region of a part of the display region 111 of the display device 110.

1-3. Effects

As described above, in the present embodiment, the information processing apparatus 100 includes the display device 110, the input device, and the processor 210. The display device 110 is configured to display the image 410. The input device is a device configured to receive the operation on the image 410 by the user, and is realized by the touch panel 120, the keyboard 130, the touch pad 140, or the buttons 150. The processor 210 causes the display device 110 to display a predetermined popup menu M1, according to a predetermined operation for calling a popup menu to the input device. The processor 210 causes the display device 110 to display the enlarged image E1 obtained by enlarging the enlargement target region R1, according to a predetermined operation for displaying the enlarged image of the enlargement target region R1 which is a part of the region in the image 410. When the input device has received the operation of calling a popup menu relevant to the enlarged image E1, while the enlarged image E1 is displayed in the display device 110, the processor 210 causes the display device 110 to stop displaying of the enlarged image of the enlargement target region E1, and causes the display device 110 to display the first enlarged popup menu EM1 obtained by enlarging the popup menu M1 at a predetermined magnification.

With the above arrangement, in the information processing apparatus 100, the user can easily visually confirm a popup menu that is called from the image displayed by enlargement. In the enlargement popup menu display processing, the enlarged popup menu EM1 of the popup menu M1 can be displayed, without displaying the popup menu M1 in a cut state in the enlarged image E1. Therefore, the user can easily visually confirm the popup menu that is called inside the image which is displayed by enlargement. That is, when the popup menu is displayed in the image displayed by enlargement, usually, only a part of the popup menu is displayed by enlargement. There is also a case where the popup menu is enlarged again in the image which is displayed by enlargement, resulting in that the popup menu becomes unnecessarily large. According to the present disclosure, the popup menu can be displayed in a proper range and by enlargement in a proper size, while solving the above problems.

Further, in the present embodiment, the processor 210 arranges the first enlarged popup menu M1, at a specific position corresponding to the display position of the popup menu M1 from which the first enlarged popup menu EM1 is obtained. When any part of the arranged first enlarged popup menu EM1' extends outside a part or a whole of the display region 111 of the display device 110, the processor 210 shifts the position of the arranged first enlarged popup menu EM1' to a specific direction. The specific direction is opposite to the extending direction of the arranged first enlarged popup menu E1 outside the display region 111 of the display device 110. The processor 210 causes the display device 110 to display the first enlarged popup menus EM1 and EM1', at the arranged position or the shifted position. The specific position is defined by coordinates on the enlargement target region 121 corresponding to designated coordinates on the enlarged image E1 for calling the first enlarged popup menu EM1. By this processing, the user can visually confirm the enlarged popup menu EM1' inside the display region 111 of the display device 110, without cutting the enlarged popup menu EM1'.

Further, in the present embodiment, when sizes of the enlarged popup menus EM1 and EM2 obtained by a magnification of the initial predetermined value are larger than a size of a part or a whole of the display region 111 of the display device 110, the processor 210 calculates a magnification for setting the sizes of the enlarged popup menus EM1 and EM2 to equal to or smaller than a size of a part or a whole of the display region 111 of the display device 110, and causes the display device 110 to display the enlarged popup menus EM1 and EM2 obtained by enlargement at the calculated magnification. Accordingly, it is possible to reduce a risk that the enlarged popup menus EM1 and EM2 are displayed by having a part of the enlarged popup menus EM1 and EM2 cut from the display device 110.

Further, in the present embodiment, while the first enlarged popup menu EM1 is displayed in the display device, when the input device has received the operation (for example, a right click while the enlarged image E1 is designated by the cursor 510) for calling a popup menu relevant to the first enlarged popup menu EM1, the processor 210 causes the display device 110 to stop carrying out the enlarged display of the first enlarged popup menu EM1, and causes the display device 110 to display the second enlarged popup menu EM2 which is obtained by enlarging, at the predetermined magnification, the popup menu M2 relevant to the first enlarged popup menu EM1. Therefore, the user can also easily visually confirm the second popup menu called from the enlarged popup menu, which is enlarged as the enlarged popup menu EM2.

In the present embodiment, the processor 210 causes the display device 110 to display the popup menu M1 of the enlargement source of the first enlarged popup menu EM1, in place of the first enlarged popup menu all, so that the enlarged display of the first enlarged popup menu EM1 is stopped. Accordingly, out of the popup menus before and after the calling, the second popup menu is displayed by enlargement and calls attention of the user. Therefore, the user can comfortably operate. On the other hand, because the first popup menu is displayed as usual, the display screen does not become complex, and the user can comfortably operate.

(Other Embodiments)

As described above, the first embodiment has been described as an exemplification of the technology disclosed in the present application. However, the technology in the present disclosure can also be applied to an embodiment in which an alteration, substitution, addition, or omission or the like has been implemented as appropriate without restriction to the first embodiment. Furthermore, it is also possible to combine the constituent elements described in the aforementioned the first embodiment to constitute a new embodiment.

Accordingly, examples of other embodiments are given hereinafter.

In the first embodiment, an example that includes one display device 110 has been described, as an example of the information processing apparatus 100. However, the number of the display device 110 included in the information processing apparatus 100 is not limited to one. Therefore, the information processing apparatus 100 may include two or more display devices 110. In this case, the image may be displayed by striding over a plurality of display devices. In normal/exceptional arrangement processing (step S410 to S440), the display device may be interpreted as a plurality of display devices. That is, the present disclosure may be applied to heights and widths of display regions of the plurality of display devices.

In the first embodiment, an example that the image 410 is displayed in the whole of the display region 111 of the display device 110 has been described. Further, the image 410 may be displayed in only a part of the display region 111 of the display device 110.

As described above, the first embodiment has been described as an exemplification of the technology in the present disclosure. The appended drawings and the detailed description have been provided for this purpose.

Consequently, in the constituent elements described in the appended drawings and the detailed description, there may be included not only constituent elements that are essential for solving the problem but also, in order to give an example of the aforementioned technology, constituent elements that are not essential for solving the problem. Therefore, the non-essential constituent elements should not be immediately perceived as being essential due to these non-essential constituent elements being described in the appended drawings and the detailed description.

Furthermore, since the purpose of the aforementioned embodiment is to give an example of the technology in the present disclosure, it is possible for various alterations, substitutions, additions, and omissions and the like to be implemented within the scope of the patent claims or within a scope equivalent thereto.

INDUSTRIAL APPLICABILITY

The present disclosure can be applied to an information processing apparatus that enlarges and displays an image. Specifically, the present disclosure can be applied to a personal computer, a smart phone, and a tablet terminal and the like.

What is claimed is:

1. An information processing apparatus comprising:
a display device configured to display an image;
an input device configured to receive an operation on the image by a user; and
a processor
configured to cause the display device to display a predetermined popup menu, associated with a feature displayed on the display device and offering further options to the user, according to a predetermined operation to the input device for calling a popup menu, and
configured to cause the display device to superimpose and display, on the image, an enlarged image obtained by enlarging an enlargement target region which is a part of a region in the image, according to a predetermined operation for displaying the enlarged image of the enlargement target region, wherein
in a state where the enlarged image of the enlargement target region is displayed in the display device,
when the input device receives an operation for calling a popup menu relevant to the enlarged image,
the processor
causes the display device to erase the enlarged image of the enlargement target region, and
causes the display device to display a first enlarged popup menu which is obtained by enlarging the popup menu relevant to the enlarged image.

2. The information processing apparatus according to claim 1, wherein the processor
arranges the first enlarged popup menu at a specific position corresponding to a display position of the popup menu from which the first enlarged popup menu is obtained,
shifts the specific position of the arranged first enlarged popup menu in a direction opposite to a specific direction, when any part of the arranged first enlarged popup menu extends outside a region of a part or a whole of a display region of the display device, the specific direction being opposite to the extending direction of the arranged first enlarged popup menu outside the region of a part or a whole of the display region of the display device, and
causes the display device to display the first enlarged popup menu at the specific position or the shifted specific position.

3. The information processing apparatus according to claim 1, wherein
when a size of the first enlarged popup menu obtained by enlarging at a magnification of a predetermined initial value is larger than a part or a whole of a display region of the display device, the processor
calculates a magnification for setting a size of the first enlarged popup menu to a size equal to or smaller than a part or a whole of the display region of the display device, and
causes the display device to display the first enlarged popup menu obtained by enlarging at the calculated magnification.

4. The information processing apparatus according to claim 1, wherein
when the input device receives an operation for calling a popup menu relevant to the first enlarged popup menu, while the first enlarged popup menu is displayed in the display device,
the processor
causes the display device to stop displaying of the first enlarged popup menu, and
causes the display device to display a second enlarged popup menu obtained by enlarging a popup menu relevant to the first enlarged popup menu at a predetermined magnification.

5. The information processing apparatus according to claim 2, wherein
the display position of the popup menu is defined by coordinates that are designated in a predetermined operation for calling the popup menu, and
the specific position is defined by coordinates on the enlargement target region corresponding to designated coordinates on the enlarged image for calling the first enlarged popup menu.

6. The information processing apparatus according to claim 1, wherein
the popup menu includes menu items that are related to coordinates designated in the predetermined operation for calling the popup menu.

7. An information processing apparatus comprising:
a display device configured to display an image;
an input device configured to receive an operation on the image by a user; and
a processor
configured to cause the display device to display a predetermined popup menu according to a predetermined operation to the input device for calling a popup menu, the popup menu being a predetermined menu that has menu items relevant to the input operation, and
configured to cause the display device to superimpose and display, on the image, an enlarged image obtained by enlarging an enlargement target region which is a part of a region in the image, according to a predetermined operation for displaying the enlarged image of the enlargement target region, wherein
in a state where the enlarged image of the enlargement target region is displayed in the display device,
when the input device receives an operation for calling a popup menu relevant to the enlarged image,
the processor
causes the display device to erase the enlarged image of the enlargement target region, and
causes the display device to display a first enlarged popup menu which is obtained by enlarging the popup menu relevant to the enlarged image.

* * * * *